(12) United States Patent
Okamoto et al.

(10) Patent No.: US 6,732,106 B2
(45) Date of Patent: May 4, 2004

(54) DIGITAL DATA DISTRIBUTION SYSTEM

(75) Inventors: Ryuichi Okamoto, Studio City, CA (US); Masayuki Kozuka, Arcadia, CA (US); Masataka Minami, Burbank, CA (US); Mitsuhiro Inoue, Studio City, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 301 days.

(21) Appl. No.: 09/731,831

(22) Filed: Dec. 8, 2000

(65) Prior Publication Data

US 2002/0073102 A1 Jun. 13, 2002

(51) Int. Cl.⁷ .............................................. G06F 7/00
(52) U.S. Cl. ...................... 707/100; 707/104.1; 705/50
(58) Field of Search ............................... 705/50, 51, 55, 705/56, 53; 707/104.1, 100

(56) References Cited

U.S. PATENT DOCUMENTS

| 5,671,412 | A | * | 9/1997 | Christiano | 707/104.1 |
| 6,134,659 | A | * | 10/2000 | Sprong et al. | 705/56 |
| 6,169,976 | B1 | * | 1/2001 | Colosso | 705/56 |
| 2002/0091643 | A1 | * | 7/2002 | Okamoto et al. | 705/53 |
| 2002/0129235 | A1 | * | 9/2002 | Okamoto et al. | 705/51 |

* cited by examiner

*Primary Examiner*—Sam Rimell
(74) *Attorney, Agent, or Firm*—Wenderoth, Lind & Ponack, L.L.P.

(57) ABSTRACT

The distribution server administers downloading of contents and writing in storage media. The distribution server includes the obtained rights administration database that stores information regarding rights to receive distribution of contents, and the history database that stores information regarding contents that have been distributed to the user in the past. The distribution server administers distribution of contents to each user.

12 Claims, 26 Drawing Sheets

Figure 4

User Registration

Service Select :

☐ Plan A  $10.00

☐ Plan B  $15..00

■ Sole Songs

User Name :
Password :
Confirm password :
Address
Telephone
Payment Type
Credit Card Number Cancel Submit

Figure 7

Alice Liddell's Private Content List

| Buy Content | | | | | | | |
|---|---|---|---|---|---|---|---|
| Private Content | Download | Sort | | Detail Info | Cancel | | |
| Account Info | | | | | | | |
| Log out | | | | | | | |

| | Title | Artist | Length | Service | No. | Available Limit |
|---|---|---|---|---|---|---|
| ☑ | Song 1 | Singer A | 03:12 | Plan A | 0 | None |
| ☑ | Song 2 | Singer A | 04:33 | Plan A | 0 | 4 times DL |
| ☐ | Song 3 | Singer A | 03:12 | Plan B | 1 | None |
| ☑ | Song 4 | Singer B | 02:42 | Plan B | 2 | None |
| ☐ | Song 5 | Singer A | 03:55 | Plan A | 0 | 1 time DL |
| ☐ | Song 6 | Singer C | 03:28 | Plan A | 1 | 2 times DL |
| ☐ | Song 7 | Singer C | 04:31 | Sole Songs | 1 | None |
| ☐ | Song 8 | Singer A | 03:29 | Sole Songs | 1 | None |
| ☐ | Song 9 | Singer D | 04:09 | Plan B | 2 | None |
| ☐ | Song 10 | Singer B | 04:18 | Plan B | 0 | None |
| ☐ | Song 11 | Singer B | 03:51 | Plan A | 0 | None |
| ☐ | Song 12 | Singer A | 04:27 | | | 1 time DL |

Figure 8

Alice Liddell's Download Media Selection

Buy Content
Private Content
Account Info
Log out

You selected following songs :

| Title | Artist | Length | Service | Available Limit |
|---|---|---|---|---|
| Song 1 | Singer A | 03 : 12 | Plan A | None |
| Song 2 | Singer A | 04 : 33 | Plan A | None |
| Song 4 | Singer B | 02 : 42 | Plan B | 2 times DL |

Choose a download device :

| Device | Drive | Volume label |
|---|---|---|
| ○ Panasonic SD-Card USB Adapter | E: | My Favorites |
| ○ Panasonic SD-Card PCMCIA Adapter | F: | (No label) |

Figure 13

| User ID | Log-in name | Password | Name | Address | Type of card | Credit card data | Service joined 1 | Service joined 2 | ... |
|---|---|---|---|---|---|---|---|---|---|
| AA00001 | david | d568v | David Moor | 123 Vineland St, Val.... | VISA | 125684563258 | SV001 | SV002 | ... |
| AA00002 | alice | hampt | Alice Liddell | 456 America Blvd, rl... | American | 1265685299959 | SV002 | ... | ... |
| AA00003 | john | w2plo | John Brown | 789 Tiger Ave, Shei... | VISA | 965842586548 | SV001 | SV003 | ... |
| ... | | | | | | | | | |

Figure 14

| Registered media ID | User ID | Type of device | Device ID |
|---|---|---|---|
| 00000001 | AA00001 | SD Card adapter | MEI05685XKOD5666 |
| 00000002 | AA00003 | PDA | 5045695215698 |
| 00000003 | AA00001 | Portable phone | 859XMOIUIS848 |
| ... | | | |

Figure 15

| Registered media ID | User ID | Type of media | Media ID |
|---|---|---|---|
| 00000001 | AA00002 | SD Card | 6528879651565476547 |
| 00000002 | AA00002 | SD Card | 12699887445223 |
| 00000003 | AA00001 | SmartMedia | 96321584758652 |
| ... | | | |

Figure 16

| Service ID | Service name | Type of charge | Monthly fee | Number of songs allowed | Number of downloads per song allowed |
|---|---|---|---|---|---|
| SV001 | Single Songs | Fee per song | --- | Unlimited | 10 times |
| SV002 | Plan A | Fixed monthly | $10.00 | 20 songs | Unlimited |
| SV003 | Plan B | Fixed monthly | $15.00 | Unlimited | Unlimited |
| .. | .. | .. | .. | .. | .. |

Figure 17

| Contents ID | Contents name | Artist's name | Service ID | Fee | Storage location |
|---|---|---|---|---|---|
| KO000001 | Content A | Singer A | SV001 | $3.25 | http://a.storage. |
| KO000002 | Content B | Singer B | SV002 | --- | http://a.storage. |
| WR000001 | Content C | Singer C | SV002 | --- | http://b.storage. |
| .. | .. | .. | .. | .. | .. |

Figure 18

| Rights ID | User ID | Contents ID | Purchase date | Service ID |
|---|---|---|---|---|
| 000001 | AA00001 | WR000001 | 12/25/2000 | SV002 |
| 000002 | AA00003 | KO000002 | 01/15/2001 | SV002 |
| 000003 | AA00001 | KO000002 | 01/20/2001 | SV002 |
| ... | | | | ... |

Figure 19

| History ID | Rights ID | Process date | Process contents | Download location media ID | Cache information |
|---|---|---|---|---|---|
| 000001 | 000001 | 12/25/2000 20:00:45 | DL | 00000001 | |
| 000002 | 000002 | 01/15/2001 18:00:27 | DL | 00000002 | C:\my music\cache\.... |
| 000003 | 000002 | 01/15/2001 18:30:08 | Cancel | --- | --- |
| ... | | | | | ... |

Figure 20

| Common account ID | User ID | System name | URL | User name | Password |
|---|---|---|---|---|---|
| 000001 | 000001 | System A | http://abc.d | david | d56dv |
| 000002 | 000002 | System A | http://abc.d | alice1 | javawaki |
| 000003 | 000002 | System B | http://xyz.d | alice | deedle |
| ... | | | | | |

DIGITAL DATA DISTRIBUTION SYSTEM

BACKGROUND OF THE INVENTION

1) Field of the Invention

The present invention relates to a digital data distribution system that enables electronic commerce in which digital data is sold for a fee via a network.

2) Description of the Related Art

In the electronic commerce that is conducted via a network, a consumer generally accesses a home page set up by an information provider. Then, the consumer selects contents of his choice, goes through a purchasing process, and downloads the contents. The digital data that has been downloaded undergoes a copyright protection process, such as encryption, in order to prevent illegal secondary distribution of the digital data that occurs through the network.

A conventional digital data distribution system will now be explained referring to FIG. 32.

Digital data to be distributed is stored encrypted in a digital data storage means 3205. A decryption key, the storage location of the encrypted digital data itself, and use condition information of the digital data are stored in a digital data administration database 3204. The use condition information herein refers to information indicating that the digital data, after it is downloaded, can be copied to another storage media three times only.

The consumer operates a user device 3202, and accesses a distribution server 3201 via a sending and receiving means 3208 communication means 3209.

A distribution front end 3206 sends to the user device 3202 a list of music digital data to be distributed. The list of the music digital data is created based on information from the digital data administration database 3204. The consumer browses the list information using a browsing means 3210. When the consumer finds digital data he wishes to receive distribution of, he sends a request for purchasing the digital data and his user name to the distribution server 3201. If the user name is not found in the user administration database 3203, the distribution front end 3206 sends, to the browsing means 3210, a request for payment information inputs such as a credit card number. The consumer inputs the requested payment information via the browsing means, and sends the payment information to the distribution server 3201. The distribution front end 3206 records the payment information in the user administration database 3203, and executes the payment process. If the user name is found in the user administration database 3203, the payment process is performed using the payment information stored in the user administration database 3203. Once the payment process is completed successfully, the distribution front end 3206 directs the digital data distribution means 3207 to send the requested digital data to the user device 3202. The digital data distribution means 3207 sends to the user device 3202 the requested digital data, which is encrypted, and the decryption key and the use condition information of the digital data that are stored in the digital data administration database 3204. Access process control means 3211 stores the encrypted digital data it received in a storage media 3214 via storage media access means 3213. Access process control means 3211 also stores the decryption key and the use condition information it received in a secure information storage means 3212. The secure information storage means 3212 stores data after encrypting the data with information that relates to the user device 3202.

When the user device 3202 plays the digital data, the access process control means 3211 reads the encrypted digital data from the storage media 3214 and the decryption key from the secure information storage means 3212, and decrypts the digital data.

When the digital data written in the storage media 3214 is to be copied to another storage media 3214, the access process control means 3211 allows the copy if the use condition information stored in the secure information storage means 3212 and copy history information, which indicates the number of past copies, indicate less than three times. In so doing, the copy history information stored in the secure data storage means 3212 is incremented by one. Also, the access process control means 3211 does not perform the copying if the copy history information indicates greater than four times.

As described above, in the conventional technology, the distribution server uses only the user information for the digital data distribution control. On the other hand, the user device administers the decryption key of the digital data, the use right information of the digital data, and the use history information of the digital data with designated secure information storage means.

Such a conventional digital data distribution system is always subject to possibilities of being hacked by malicious consumers, such as illegal obtainment of the digital data from the distribution server 3201 and illegal secondary distribution of the digital data that has been distributed to the user device 3202. As a result, a user device 3202 that is particularly prone to parsing by malicious consumers have the secure information storage means 3212 and the access process control means 3211 that are more or less equipped with a tamper-resistant technology.

However, the aforesaid conventional structure has the following problems.

Since the user device stores the use condition information and the history information of the digital data securely, correlating the information with the user device, when the consumer wishes to change the user device, it is difficult to transfer these information.

Since the distribution server does not recognize digital data once the digital data is distributed, there is no system of redistributing the digital contents, even when the consumer cannot use the distributed contents anymore because, for instance, he broke the user device.

Even though the distribution server stores the information regarding the history of distribution to the user, since the information that identifies the user is pure information such as a user name and payment information, the security level is not very high.

SUMMARY OF THE INVENTION

The present invention has been conceived for the aforementioned situations. More specifically, the object of the present invention is to provide a digital data distributions system in which rights information of digital data and history information are administered at the distribution server, and authorization of users is executed using a user device ID.

To achieve the aforementioned object, the digital data distribution system according to the present invention is characterized in that the distribution server has an obtained rights administration database that stores information regarding rights to receive distribution of digital data that each user has obtained, and a history database that stores information regarding digital data that have been distributed to the users in the past.

Further, the digital data distribution control method according to the present invention is characterized in that the distribution front end processes a request for distribution of digital data sent from a user, based on information from the obtained rights administration database and the history database.

Still further, the digital data distribution cancellation method according to the present invention is characterized in that the distribution front end processes a request for canceling the right to digital data distribution sent from a user, based on information from the obtained rights administration database and the history database.

Still further, the digital data distribution system according to the present invention is characterized in that the user device includes the storage media having a media ID that can uniquely identify each storage media, a media ID detecting means for detecting the media ID and sending the media ID to the distribution server, and a media access process control means for executing control of writing the digital data distributed by the distribution server in the storage media that has the designated media ID, and that the distribution server includes an encryption means for encrypting the distributed digital data using a key that is created based on the media ID received from the user device.

Still further, the digital data distribution server according to the present invention is characterized in that the user device includes the media access process control means that sends the media ID of the storage media to the distribution server when the storage of the distributed encrypted digital data in the storage media is successful, and that the distribution server includes the history database that stores the media ID along with information regarding the encrypted digital data, the media ID being received after the encrypted digital data is sent to the user device, and the distribution front end that detects a number of types of media IDs to which digital data have been distributed in the past in response to a request for distribution of digital data from the user, and does not process the request for distribution if the number is greater than a predetermined number.

Still further, the digital data distribution server according to the present invention is characterized in that the user device includes the storage media having more than two different memory regions, at least one of the memory regions being a secure data area that cannot be accessed without an authorization between the storage media and the storage media access means, the storage media having a media ID that can uniquely identify each storage media, a media ID detecting means for detecting the media ID and sending the media ID to the distribution server and a media access process control means for storing encrypted digital data distributed by the distribution server in a memory region that is not the secure data area and storing an encrypted decryption key distributed by the distribution server in the secure data area after decrypting the encrypted decryption key with the media ID, and that the distribution server includes a distributed digital data storage means for storing the encrypted distributed digital data and the encrypted decryption key that decrypts the distributed digital data, an encrypting means for encrypting the decryption key using a key that is created based on the media ID received from the user device, and the digital data distributing means for sending the encrypted digital data and the decryption key that is encrypted with the encrypting means to the user device.

Still further, the digital data distribution server according to the present invention is characterized in that the user device includes the cache storage means that is separate from the storage media, the media access process control means storing the distributed encrypted digital data in the storage media and the cache storage means, and sending the storage location information to the distribution server, and the media access process control means that stores encryption data designated by the storage location information in the memory region which is not the secure data area when storage location information of the encryption digital data stored in the cache storage means is received instead of receiving the encrypted digital data from the distribution server, and that the distribution server includes the history database that stores the storage location information along with information regarding the encrypted digital data, the storage location information being received after the encrypted digital data is sent to the user device, and the distribution front end that refers to the history database in response to a digital data distribution request from a user, the distribution front end directing the digital data distributing means to send storage location information instead of the digital data if the requested digital data is digital data that has been distributed in the past and its storage location information exists.

Still further, the digital data distribution server according to the present invention is characterized in that the user device includes the media access control means that sends a media ID of the storage media if the distributed encrypted digital data is stored in the storage media successfully, and that the distribution server includes the history database that stores the media ID that is received after the encrypted digital data is sent to the user device, along with information regarding the encrypted digital data, and the distribution front end that detects the number of types of media ID to which the digital data of which distribution is requested has been sent in the past in response to the digital data distribution request from the user, the distribution front end not processing the distribution request if the number is greater than a predetermined number.

Still further, the digital data distribution server according to the present invention is characterized in that the distribution server includes a common account database for storing account information of another digital data distribution system the user has joined, an inter-server gateway that communicates with the another digital database distribution system and accesses the another digital data distributions system using account information stored in the common account database when a user whose information is in the common account database accesses the distribution front end, and the distribution front end that checks the common account database when a user accesses the distribution server, the distribution front end obtaining and writing information from and in the user administration database, the digital data administration database, the obtained rights administration database, and the history database of the another digital data distribution system via the inter-server gateway, if the account information under a user ID of the user is stored.

Still further, the digital data distribution server according to the present invention is characterized in that the user device includes a device ID that can uniquely identify each user device and a device ID detecting means for identifying the device ID and sending the device ID to the distribution server, and that the distribution server includes a user administration database that stores user IDs and related account information of the users.

Still further, the digital data distribution control method according to the present invention is characterized in that in response to a request for digital data distribution from a user who is accessing the distribution server, the distribution front end directs the device ID detecting means to identify a device ID, then, the device ID detecting means detects the device ID and sends the device ID to the distribution server, then, the distribution front end checks whether the device ID that has been received is registered in the user device administration database as the corresponding user's information, and directs the digital distribution means to distribute the requested digital data to the device ID that has been sent if the device ID is registered, then, the digital data distribution means sends the digital data and the device ID to the user device, and then, the media access process control means confirms whether the device ID that has been received is the same as its own device ID, and if it is, directs writing of the digital data in the storage media that is connected to the storage media access means.

Still further, the device information registration method according to the present invention is characterized in that in response to a request for digital data distribution from a user who is accessing the distribution server, the distribution front end directs the device ID detecting means to identify a current device ID, then, the device ID detecting means identifies the device ID and sends to the distribution server, and then, the device ID that the distribution front end received is registered in the user device administration database along with a corresponding user ID.

BRIEF DESCRIPTION OF THE DRAWINGS

FIG. 4 shows a user registration screen

FIG. 7 shows a download digital data selection screen.

FIG. 8 a downloading location selection screen.

FIG. 13 shows a user account information database.

FIG. 14 shows a user device information database.

FIG. 15 shows a storage media information database.

FIG. 16 shows a service type database.

FIG. 17 shows a digital data information database.

FIG. 18 an obtained rights administration database.

FIG. 19 shows a history database.

FIG. 20 shows a common account database.

FIG. 26 shows a process flow of digital data download.

DESCRIPTION OF THE PREFERRED EMBODIMENTS

Figure 1:
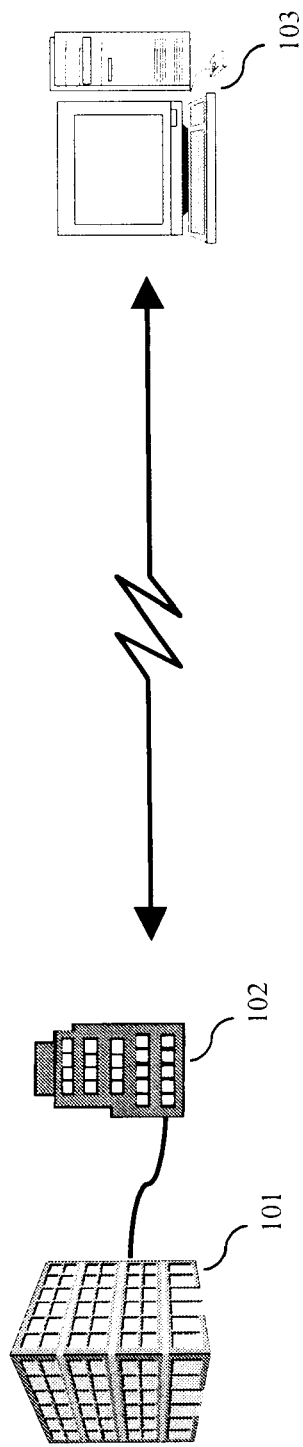
FIG. 1 shows a digital data distribution system in accordance with the first embodiment.

According to a digital data distribution system of the present invention, a distribution server stores in an obtained rights administration database a digital data ID of digital data of which the user has obtained the right to receive distribution by going through the proper procedure, and a condition for receiving distribution of the digital data. In this manner, by storing in the history database the digital data ID which has been distributed in the past and the number of times of the distribution, the user device does not need to store these information.

According to a digital data distribution method of the present invention, when a request for digital data of which the consumer has obtained the right to receive distribution is made, the requested digital data is sent to the consumer if the distribution condition is met, by comparing the number of digital data, of which the same consumer registered in the history data is authorized to receive distribution, the number of times of distribution, and the distribution condition information. The number of digital data and the number of times are stored in the obtained rights administration database, while the distribution condition information is stored in the history database.

According to a digital data distribution rights cancellation method of the present invention, if it is found upon searching the history database that the consumer has never had digital data distributed although the consumer has obtained right to receive the digital data by going through proper procedures, the records in the obtained rights administration database or the history database can be changed to cancel the rights, upon a request by the consumer.

According to the digital data distribution system of the present invention, a media ID of a storage media that the consumer has designated as the distribution location is sent by media ID detecting means to the distribution server. The media ID can uniquely identify each storage media. Then, the distribution server encrypts the digital data distributed by the encryption means using a key created based on its media ID. Then, once the media access process control means stores the digital data in the designated media, the distributed digital data can only be utilized with the designated media. The digital data is encrypted in advance. Its decryption key is stored in the distribution digital data storage means. The decryption key, instead of the digital data, may be encrypted and sent to the user device.

According to the digital data distribution system of the present invention, when the device ID to which digital data is distributed is registered in the history database, and when the digital data is deleted from the storage media in which the digital data has once been written, the media ID detecting means sends the media ID of the storage media to the distribution server, and the media access process control means sends the digital data ID to the distribution server. By modifying records in the obtained rights administration database or the history database, the distribution of the deleted digital data will not be counted as the number of times of distribution at the time of verification of digital data distribution condition.

According to the digital data distribution system of the present invention, the media access process control means sends, to the distribution server, the media ID of the storage media in which the distributed digital data is to be written. The distribution front end stores, in the history database, the media ID and the digital data ID that has been written. When the consumer requests distribution of the same digital data, the number of types of media IDs to which the digital data has been distributed is detected from the history database. If the number is greater than a predetermined number, the request for distribution is not processed, thereby preventing illegal copying of digital data.

According to the digital data distribution system of the present invention, the storage media has more than two different memory regions, one of the memory regions being a secure data area that cannot be accessed without an authorization between the storage media and the storage media access means. The storage media has a media ID that can uniquely identify each storage media. Also, the media ID detecting means detects the media ID and sends the media ID to the distribution server. Then, in the distribution server, the encrypting means encrypts the decryption key using a key that is created based on the media ID received from the user device. The digital data distributing means sends the encrypted digital data and the encrypted decryption key to the user device. Then, the media access process control means stores the encrypted digital data distributed by the distribution server in a memory region that is not the secure data area, and the encrypted decryption key in the secure data area after decrypting the encrypted decryption key with the media ID. In this manner, distributed digital data can only be utilized in the designated media.

According to the digital data distribution system of the present invention, when the device ID to which digital data is distributed is registered in the history database, and when the digital data is deleted from the storage media in which the digital data has once been written, the media ID detecting means sends the media ID of the storage media to the distribution server, and the media access process control means sends the digital data ID to the distribution server. By modifying records in the obtained rights administration database or the history database, the distribution of the deleted digital data will not be counted as the number of times of distribution at the time of verification of digital data distribution condition.

According to the digital data distribution system of the present invention, the user device includes cache storage means that is separate from the storage media. The media access process control means stores the distributed encrypted digital data in both the storage media and the cache storage means. The storage location information stored in the cache storage means is sent to the distribution server. Then, the distribution front end stores the storage location information that has been received in the history database along with its digital data ID. Then, when there is a digital data distribution request from a user, instead of sending the digital data, the storage location of the pertinent digital data and the decryption key of the digital data are sent to the user device. Upon receiving the storage location, the media access process control means stores the encrypted digital data that is stored in the cache storage means in the memory region which is not the secure data area. Therefore, time to redistribute the digital data via the net can be saved.

According to the digital data distribution system of the present invention, the media access control means sends, to the distribution server, a media ID of the storage media in which the distributed digital data is written. The distribution front end stores the media ID and the written digital ID in the history database. When the consumer requests distribution of the same digital data, the distribution front end that detects the number of types of media ID to which the digital data has been sent. If the number is greater than a predetermined number, the distribution front end does not process the distribution request, thereby preventing illegal copying of digital data.

According to the digital data distribution system of the present invention, a common account database stores account information of another digital data distribution system the user has joined, such as a user name and password in the another digital data base distribution system. Upon a request from the consumer, the distribution front end communicates with the another digital data distribution database through the inter-server gateway. By accessing the user administration database, the digital data administration database, the obtained rights administration database, and the history database of the another digital data distribution system, digital data that has been legitimately obtained in another digital data distribution system can be obtained from this digital data distribution system.

According to the digital data distribution system of the present invention, the user device includes a device ID that can uniquely identify each user device, and the distribution server has a user administration database that stores user IDs and related account information of the users. The distribution server verifies at the time of access by the consumer, whether the device ID that has been sent thereto is registered in the user device administration database. If the device ID is registered, the consumer's access is authorized. In this manner, better security can be ensured by conducting the access control with user ID only.

According to the digital data distribution system of the present invention, when the consumer requests distribution of digital data, the device ID detecting means identifies the device ID and sends the device ID to the distribution server. Then, the distribution front end checks whether the device ID that has been received is registered in the user device administration database as the corresponding user's information. If the device ID is registered, the distribution front end directs the digital distribution means to distribute the requested digital data to the device ID that has been sent. Then, the digital data distribution means sends the digital data and the device ID to the user device. Then, the media access process control means confirms whether the device ID that has been received is the same as its own device ID. If it is, the media access process control means directs writing of the digital data in the storage media that is connected to the storage media access means. In this manner, better security can be ensured by conducting the writing control with user ID only.

According to the digital data distribution system of the present invention, in response to a request for digital data distribution from a user who is accessing the distribution server, the device ID detecting means identifies the device ID and sends to the distribution server. Then, the distribution server registers the device ID that the distribution front end received in the user device administration database along with a corresponding user ID. In this manner, the device can be registered via the network.

According to the digital data distribution system of the present invention, the user device includes a device ID that can uniquely identify the storage media access means, and the distribution server includes a user device administration database that stores the user ID and the device ID that each consumer uses. The distribution front end verifies whether the user ID of the consumer and the device ID that has been sent are registered in the user device administration database at the time of access by the consumer. If they are registered, the access by the consumer is authorized. In this manner, better security can be ensured by conducting the access control with the user ID only.

According to the digital data distribution system of the present invention, in response to a request for digital data distribution from a consumer, the device ID detecting means identifies the device ID, and sends it the device ID to the distribution server. Then, the distribution front end displays to the user the device ID that is registered in the user device administration database as information of the corresponding user, out of the device IDs that the distribution front end has received. Then, the user selects one from the device IDs that have been displayed, using the browsing means. Then, the browsing means sends the selected device ID to the distribution server. Then, the distribution front end directs the digital data distribution means to send the requested digital data to the device ID that has been sent. Then, the digital data distribution means sends the digital data and the device ID to the user device. Then, the media access process control media directs writing of the digital data that has been received in the storage media that is connected to the storage media access means having the device ID.

According to the digital data distribution system of the present invention, in response to a request for digital data distribution from a user who is accessing the distribution server, the device ID detecting means identifies the device ID and sends it to the distribution server. Then, the distribution front end registers the device ID that the distribution front end received in the user device administration database along with a corresponding user ID.

(Embodiments)

Embodiments of the present invention will now be explained below, referring to figures.

FIG. 1 is an application of a digital data distribution system in accordance with the present embodiment. 101 is a digital data distribution service firm which sets up homepages for conducing the electric commerce. 103 is a personal computer operated by a consumer. 102 is an internet service provider which connects the digital data distribution service firm 101 and the personal computer 103 of the consumer via a network.

In this embodiment, a situation where the digital data is music digital data is discussed as an example. Further, services provided by the digital data distribution system include three services: single sale service in which each song has a fixed price, a subscription service in which the consumer can freely download any desired songs from a designated group of music digital data up to a predetermined number upon paying a monthly fixed fee, and another subscription service in which the consumer can download an unlimited number of desired songs from a group of music digital data upon paying a monthly fee.

Figure 10:
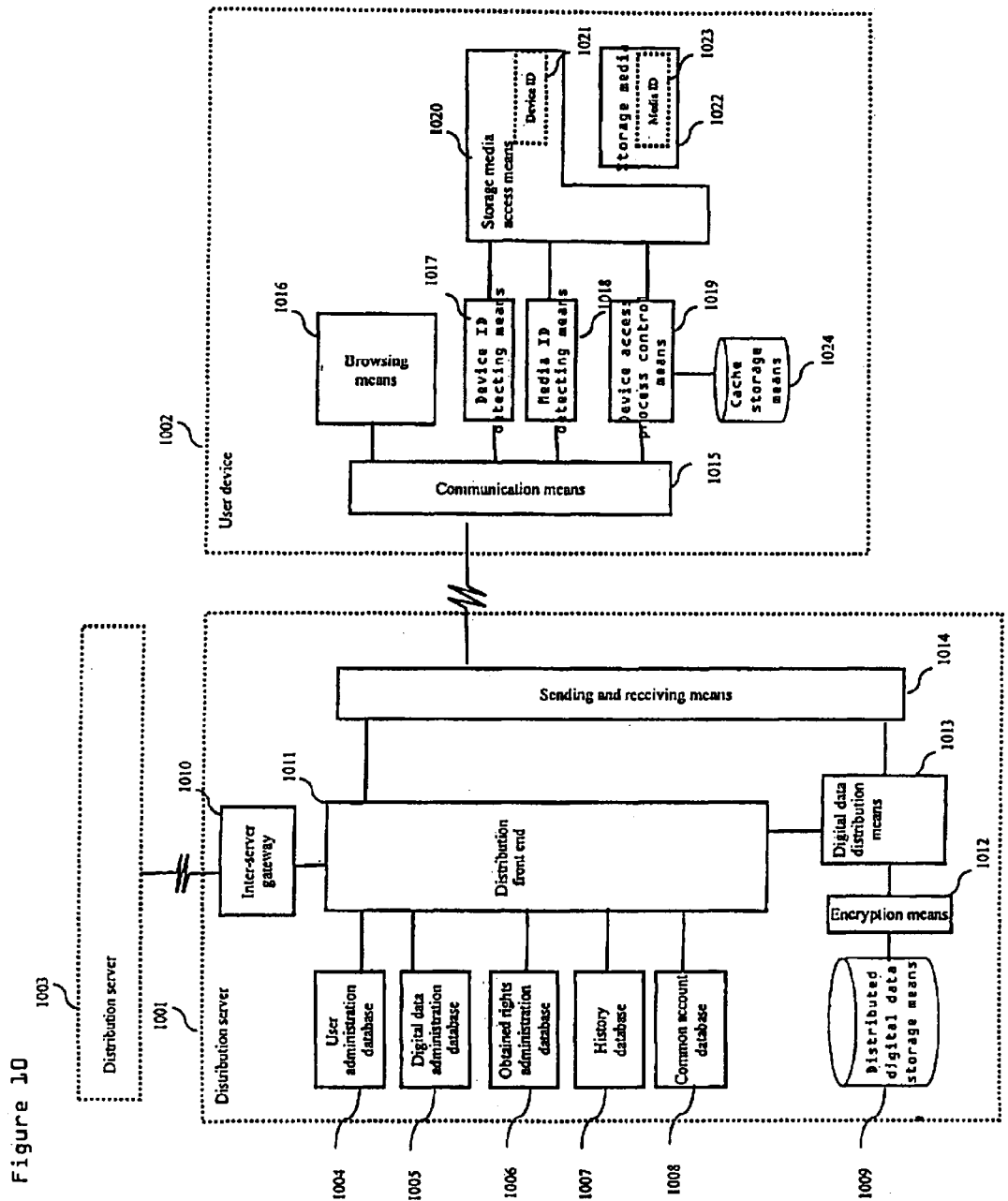
FIG. 10 shows a structural view of the embodiment.

FIG. 10 is a view of a structure of a digital data distribution system in accordance with the present embodiment. The digital data distribution system of the present embodiment includes a distribution server 1001, a user device 1002, and a distribution server 1003 which is different from the distribution server 1001. The distribution server 1001 includes a user administration database 1004, a digital data administration database 1005, an obtained rights administration database 1006, a history database 1007, a common account database 1008, distributed digital data storage means 1009, an inter-server gateway 1010, a distribution front end 1011, encryption means 1012, digital data distribution means 1013, and sending and receiving means 1014.

The user device 1002 includes communication means 1015, browsing means 1016, device ID detecting means 1017, media ID detecting means 1018, device access process control means 1019, storage media access means 1020, a device ID 1021, a storage media 1022, a media ID 1023, and cache storage means 1024. The distribution server 1003 has the same structural elements as the distribution server 1001.

Each structural element will now be explained below.

The user administration database 1004 is a relational database that includes three databases: a user account information database that stores users' account information, a user device information database that stores user device information that is recognized as the users' distribution location of the digital data, and a storage media information database that stores information of storage media that users have used as the distribution location in the past. FIG. 13 is the user account information database. The user account information database includes user ID, log-in name, password, user's name, user's address, the type of credit card with which payment is to be made, credit card number, and information of the music distribution service plan the user has joined. FIG. 14 is the user device information database. The user device information database includes device registration ID, which is the index information of this database, user ID of the owner of the device, information regarding the type of equipment of the user device, and equipment ID. FIG. 15 is the storage media information database. The storage media information database includes media registration ID, which is the index information of this database, user ID of those who have received distribution of digital data, information regarding the type of media, and media ID The digital data administration database 1005 includes a service type database which stores digital data vending service plans that are sold at the site, and a digital data information database that stores information regarding the digital data itself and information regarding the storage locations of the digital data. FIG. 16 is the service type database. The service type database includes service ID that is the index information, service name, the type of payment methods for the service, fee for the service, information regarding the limit on the number of songs per user that can be downloaded, and information regarding the limit on the number of times of download per song. FIG. 17 is the digital data information database. The digital data information database includes the digital data ID, the name of the digital data song, the name of the singer, service ID to which the digital data belongs, the fee for the digital data, and information regarding storage location of the digital data.

The obtained rights administration database 1006 is a database that administers rights to have digital data distributed, which are obtained by the users. As shown in FIG. 18, the obtained rights administration database 1006 includes rights ID, which is the index, user ID which has obtained rights to have digital data distributed, its digital data ID, the date of obtaining the rights, and service ID to which the digital data belongs.

The history database 1007 is a history database that administers information regarding distributions to the users and information regarding cancellation of distributions. As shown in FIG. 19, the history database 1007 includes history ID, which is the index, pertinent rights ID, the date of the process, the contents of the process, media ID of the distribution location, and cache information.

The common account database 10008 is a database that administers account information for accessing databases of other digital distribution systems. As shown in FIG. 20, the common account database 1008 includes common account ID which is the index, pertinent user ID, the name of other digital data distribution system, URL information for accessing the system, and user name and password for accessing the system.

The distributed digital data storage means 1009 stores the digital data to be distributed, with the digital data being encrypted. The distributed digital data storage means 1009 also stores their decryption keys.

The inter-server gateway 1010 is a communication means that communicates with other digital data distribution systems.

The distribution front end 1011 creates homepage screen data of the homepage to which the user accesses, and provides the homepage screen data to the user. The distribution front end 1011 also executes processes responding to operations that the user performs on the homepage screen data created by the distribution front end 1011.

The encryption means 1012 executes a process that encrypts the decryption key stored in the distribution digital data storage means 1009.

The digital data distribution means 1013 executes a process that sends the digital data and the decryption key to the user device 1002.

The sending and receiving means 1014 and the communication means 1015 execute the communication process between the distribution server 1001 and the user device 1002.

The browsing means 1015 browses the homepage screen data, and executes operations thereon.

The device ID detecting means 1017 obtains the device ID 1021, which is included in the storage media access means 1020, and then sends the device ID 1021 to the distribution server 1001.

The media ID detecting means 1008 obtains the media ID 1023, which is included in the storage media 1022 to which the storage media access means 1020 accesses, and then sends the media ID 1023 to the distribution server 1001.

When the digital data is sent from the distribution server 1001, the device access process control means 1019 stores the digital data in the storage media 1022 by controlling the storage media access means 1020, and at the same time, stores the same digital data in the cache storage means 1019. Then, when the information regarding the digital data storage location is sent, the media access process control means 1019 stores the digital data that has already been distributed and stored in the cache storage means 1024 in the storage media 1022, by controlling the storage media access means 1020.

Figure 11:
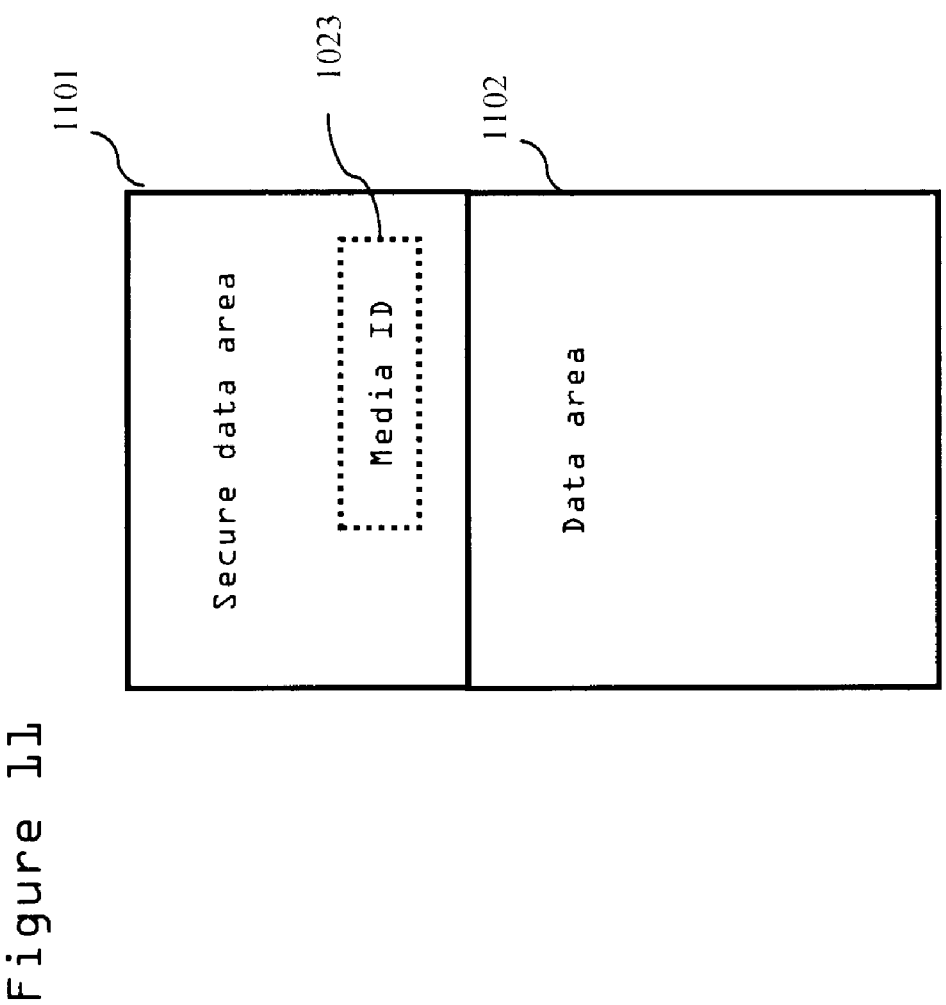
FIG. 11 shows a storage media.

The storage media 1022 is a semiconductor memory card having the media ID 1023, which is a unique ID. As shown in FIG. 11, the storage media 1022 has a secure data area 1101, which cannot be accessed without an authorization from the storage media access means 1020, and a data area 1102 which can be accessed without the authorization. The media ID 1023 is stored in the secure data area 1101.

The storage media access means 1020 is a card adapter that reads and writes data from and in the storage media 1022. The storage media access means 1020 has the device ID 1021, which is a unique ID.

In this embodiment, the storage media access means 1020 is attached to the personal computer 103 externally. One or a plurality of storage media access means 1020 can be connected to the personal computer 103.

Operation of each element will now be explained below, with respect to each operation offered by the digital data distribution system.

Figure 21:
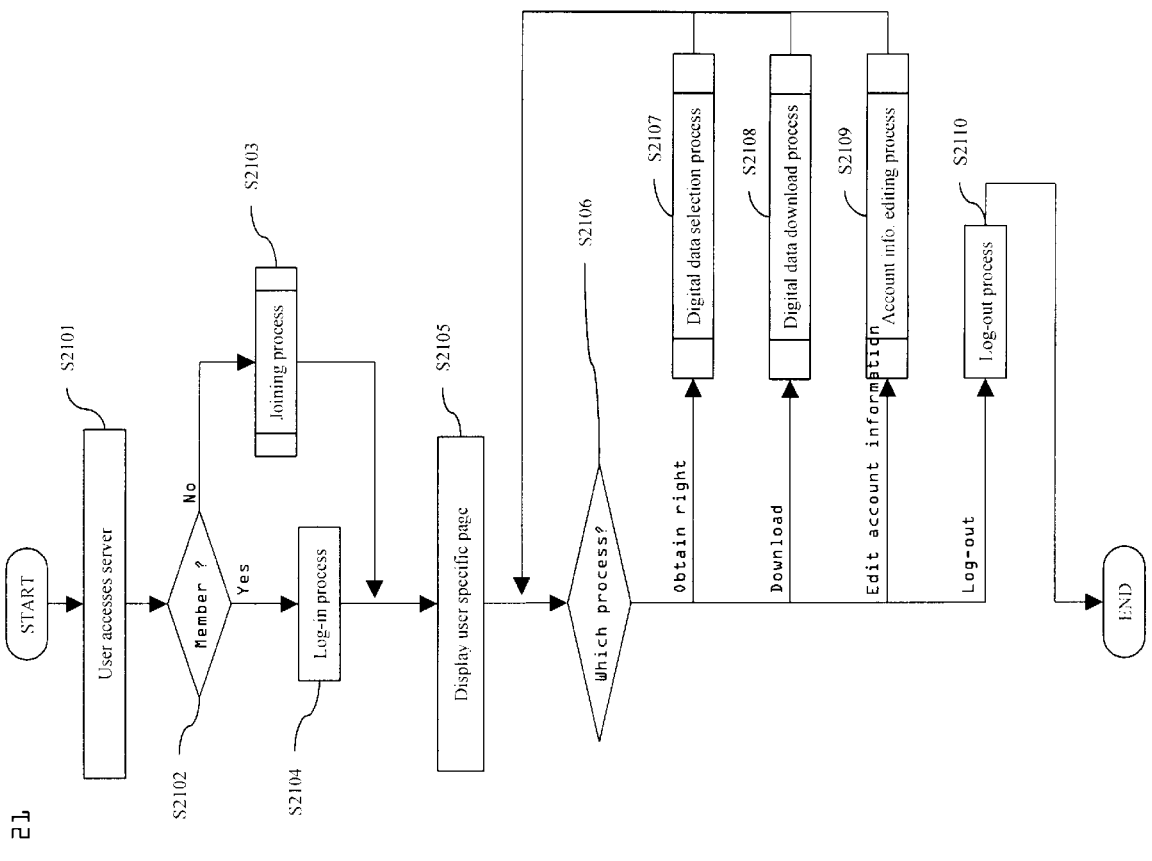
FIG. 21 shows an overall process flow.

FIG. 21 shows a flow of the overall operation of the digital data distribution system.

The user accesses the distribution front end 1011, using the browsing means 1016. (S2101)

Figure 3:
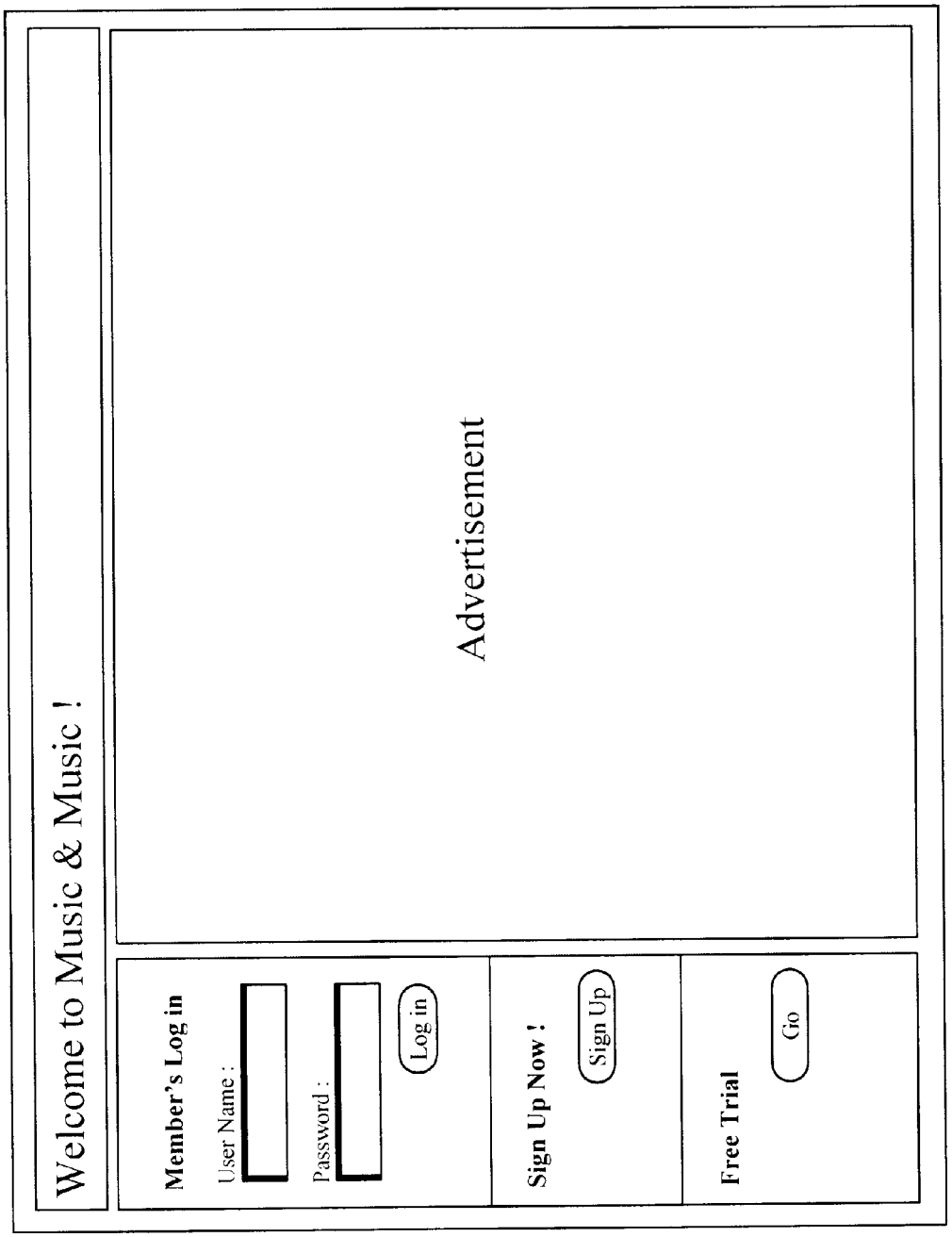
FIG. 3 shows a log-in screen.

The distribution front end 1011 creates a log-in screen such as one shown in FIG. 3, and sends the log-in screen to the browsing means 1016. (S2102) If the user is not a member of the service of this system, a joining process, which will be described later, is executed. (S2103)

If the user is a member of the service of this system, the user logs in by inputting the user name and the password. (S2104)

Figure 5:
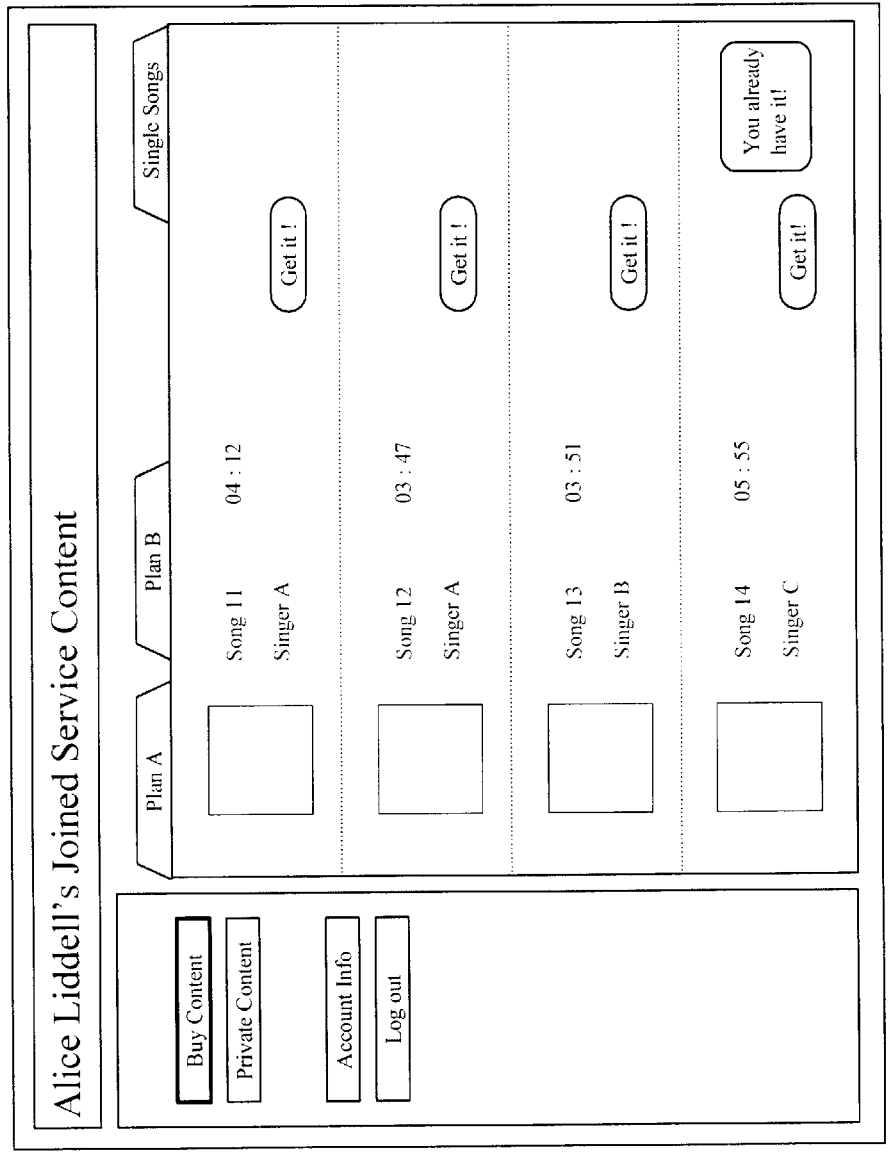
FIG. 5 shows a subscription service digital data selection screen.
Figure 6:
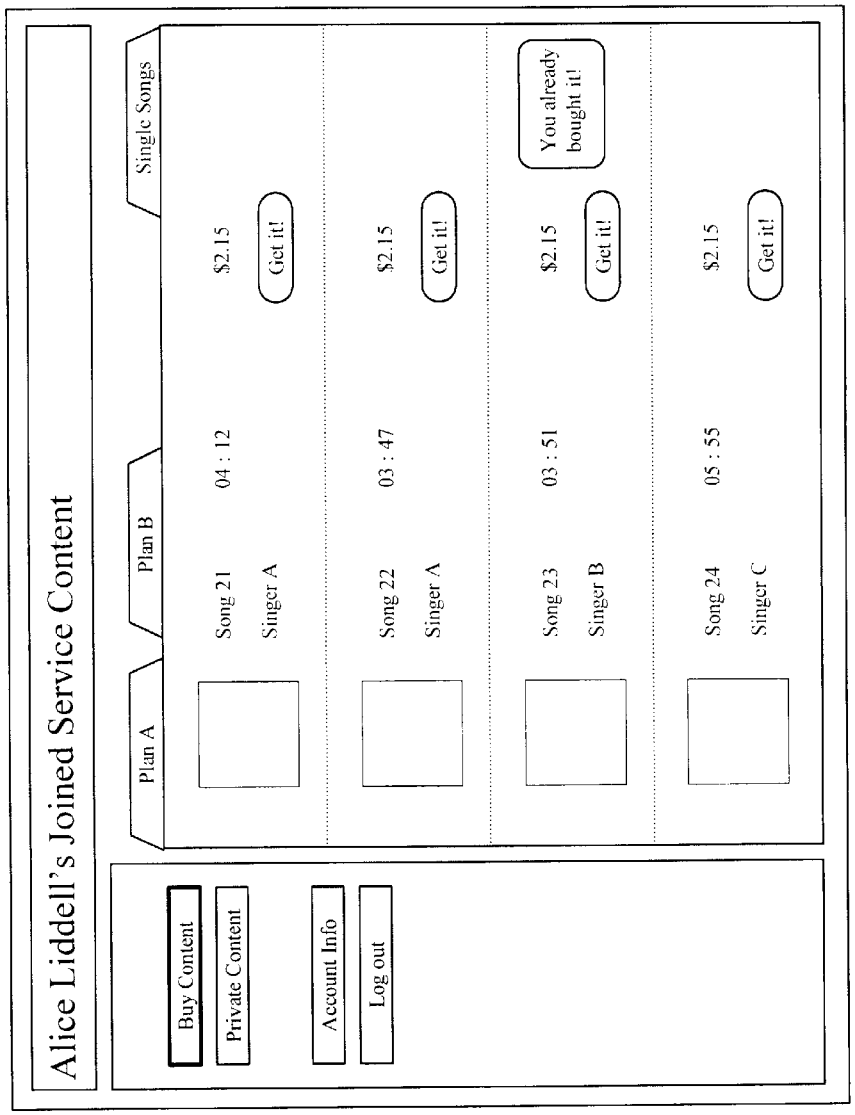
FIG. 6 shows a single sale service digital data selection screen.

If the log-in is successful, the distribution front end 1011 creates a selection screen such as one shown in FIG. 5, in which the user selects a song he wishes to obtain the right to download. The selection screen is sent to the browsing means 1016. (S2105)

Then, the user selects which process he wishes to execute. More specifically, the user selects from obtainment of right to download digital data, downloading of digital data of which the right to download has already been obtained, editing of the user account information, and log-out. (S2106)

If the user has selected obtainment of right to download digital data in S2106, a digital data selection process, which will be described later, is executed. Then, the system returns to S2106. (S2107)

If the user has selected downloading of digital data of which the right to download has already been obtained in S2106, a digital data downloading process, which will be described later, is executed. Then, the system returns to S2106. (S2108)

If the user has selected editing of the user account information in S2106, an account information editing process, which will be described later, is executed. Then, the system returns to S2106. (S2109)

If the user has selected log-out in S2106, the connection between the distribution server 1001 and the user device 1002 is disconnected, and this process ends. (S2110)

Figure 22:
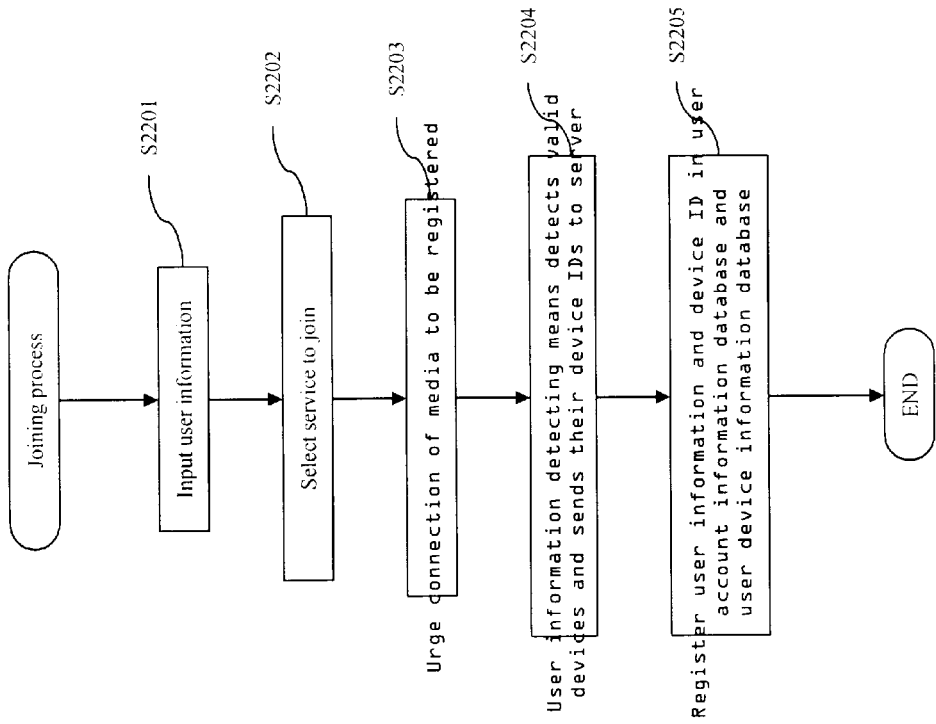
FIG. 22 shows a process flow of joining.

FIG. 22 shows an operational flow of the joining process.

The browsing means 1016 displays a user registration screen such as one shown in FIG. 4. The user then fills in required items, namely the user name, the password, the address, the phone number, and the credit card number to be used for payment. (S2201)

Next, the user selects the service he wishes to join. In the case of the single sale service, the user does not need to go through the joining process, since the user pays each time he purchases a song. The browsing means 1016 sends the inputted information to the distribution server 1001. (S2202)

Next, the distribution front end 1011 creates a screen which urges the user to connect with the user device 1002, the storage media access means 1020 that the user wishes to use as a device for writing digital data for the purpose of this service. The screen is sent to the browsing means 1016. The user connects with the user device 1020 the storage media access means 1020 that he wishes to use as a device for writing digital data. (S2203)

The device ID detecting means 1017 detects the device IDs 1021 from all the storage media access means 1020 that are connected to the user device 1002. Then, the device ID detecting means 1017 sends the device IDs 1021 to the distribution server 1001. (S2204)

The information sent is stored in the user account information database or the user device information database by the distribution front end 1011. (S2205)

The above concludes this process.

Figure 23:
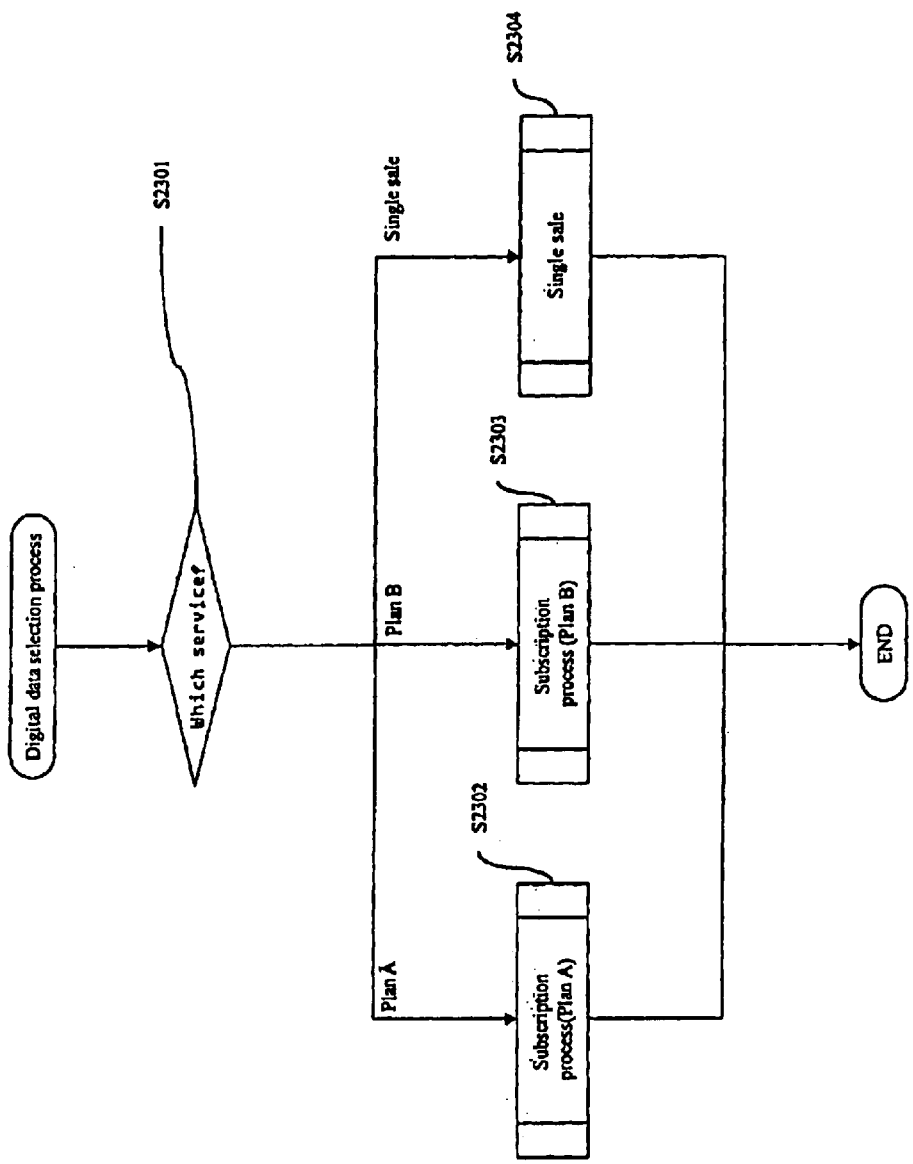
FIG. 23 shows a process flow of digital data selection.

FIG. 23 shows an operational flow of the digital data selection process.

The user selects the service he wishes to receive. (S2301)

Next, a process for obtaining the right to download the service that the user selected in S2301 is executed. Here, if the service that the user selected in S2301 is a subscription service, a subscription processing process, which will be described later, is executed. If the service that the user selected in S2301 is a single sale service, a single sale processing process, which will be described later, is executed. (S2302–S2304)

This concludes the description of the digital data selection process.

Figure 24:
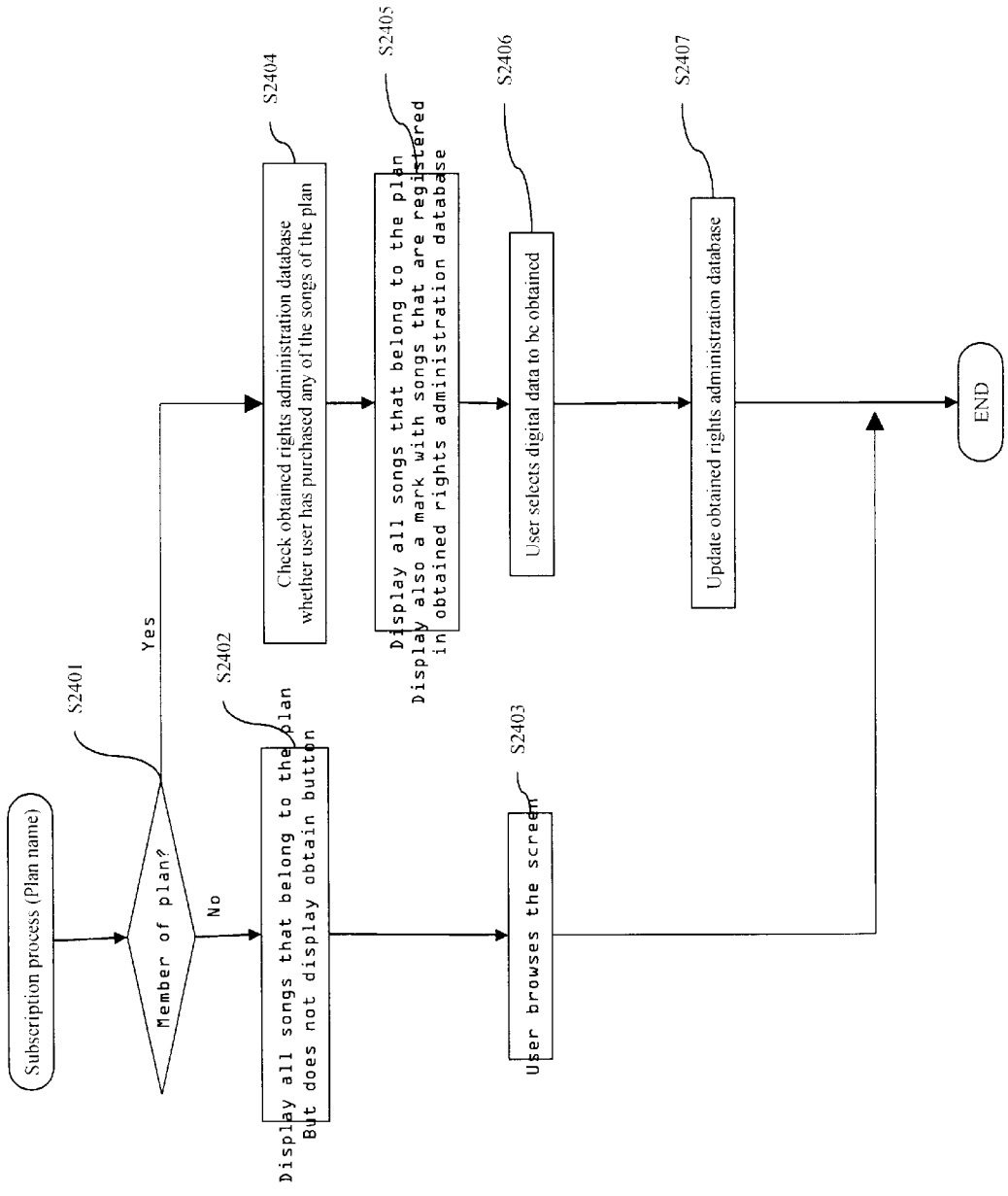
FIG. 24 shows a process flow of subscription process.

FIG. 24 shows an operational flow of the subscription processing process.

First of all, the distribution front end 1011 verifies whether the user is a member of the subscription service that has been selected. (S2401)

If it is determined in S2401 that the user is not a member, the distribution front end 1011 creates a screen that shows a list of digital data that belong to the selected service based on the digital data administration database 1005, such that selection of digital data can not be made. The screen is sent to the user device 1002. (S2402)

In this case, the user can only browse the digital data list using the browsing means 1016. (S2403)

If it is determined in S2401 that the user is a member, the distribution front end 1011 creates a screen data that displays a list of digital data that belong to the selected service such that the user can make a selection. In the screen, the digital data of which the right to download has already been obtained bears a mark indicating that the right has already been obtained. The screen data is sent to the user device 1002. (S2404, S2405)

The user selects digital data that he wishes to obtain, using the browsing means 1016. Then, selected digital data is sent to the distribution server 1001. (S2406)

The distribution front end 1011 newly records in the obtained rights administration database the digital data of which obtainment is requested, based on the information that has been received. (S2407)

The above concludes this process.

Figure 25:
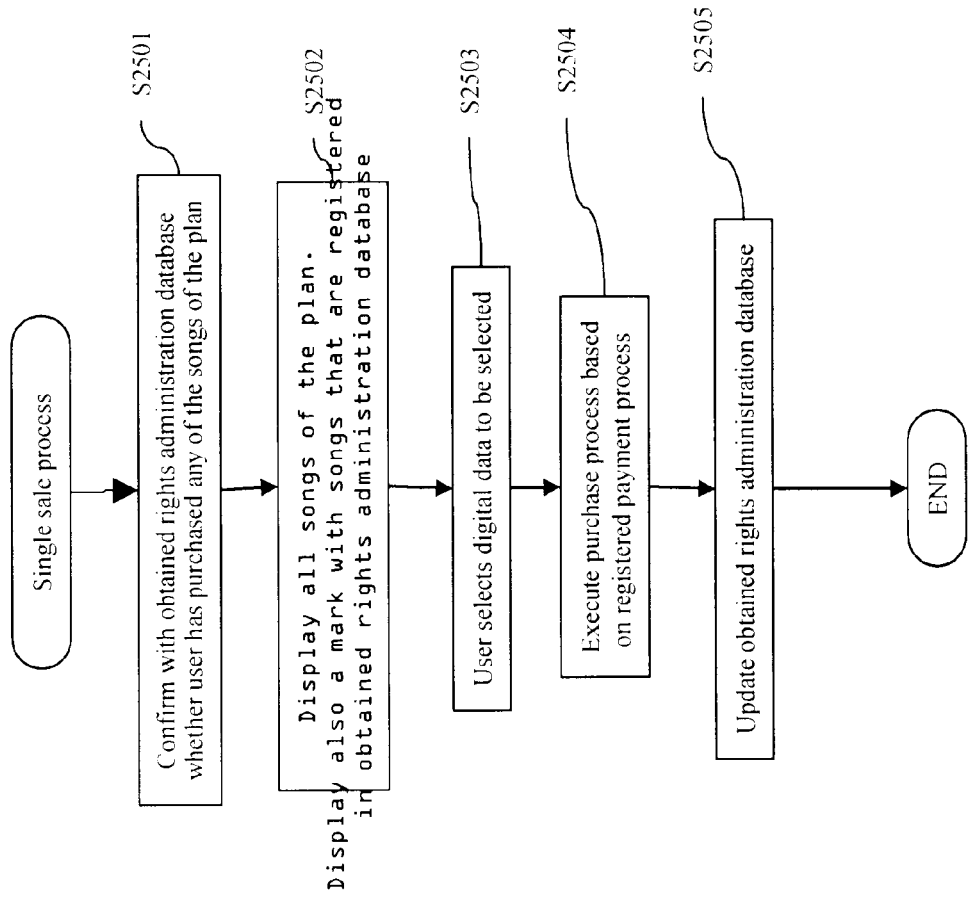
FIG. 25 shows a process flow of single sale process.
Figure 2B:
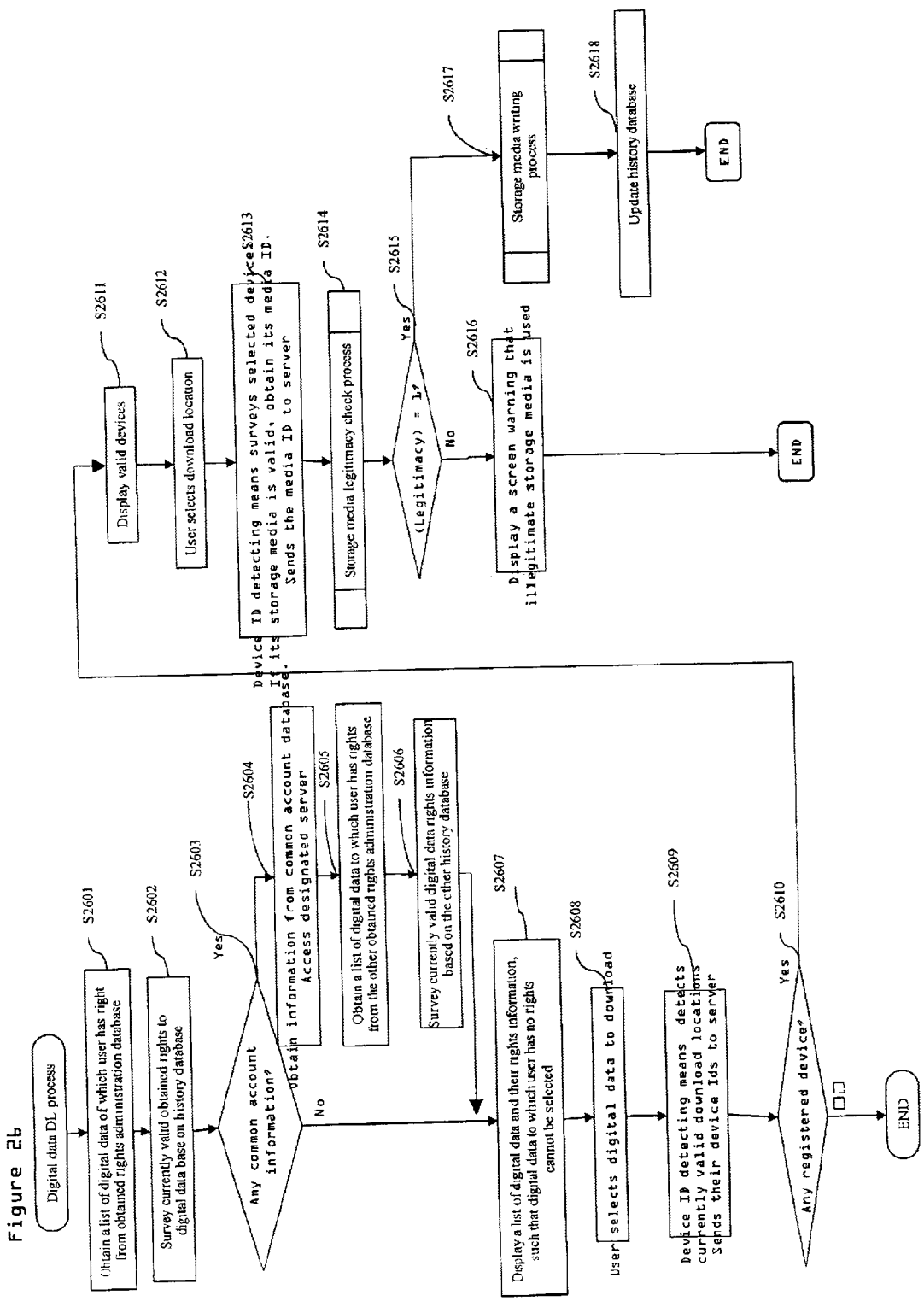

FIG. 25 shows an operational flow of the single sale processing process.

The distribution front end 1011 creates a screen data that includes a list of digital data that belong to the single sale service based on the digital data administration database 1005, such that the user can make a selection. In the screen, the digital data that are registered in the obtained rights administration database 1006 bear a mark indicating that the right has already been obtained. The screen data is sent to the user device 1002. (S2501, S2502)

The user selects the digital data that he wishes to obtain, using the browsing means 1016. The selected digital data is sent to the distribution server 1001. (S2503)

The distribution front end 1011 calculates the price of digital data that the user has requested to obtain. Then, a purchasing process is executed using the payment information registered in the user administration database 1004. (S2504)

Lastly, the distribution front end 1011 newly registers in the obtained rights administration database the information regarding the digital data for which the purchasing process has been executed. (S2505)

The above concludes this process.

FIG. 26 shows an operational flow of the digital data download process.

First of all, the distribution front end 1011 obtains from the obtained rights administration database 1006 a list of digital data of which the user has obtained the right to download. (S2601)

Next, the distribution front end 1011 obtains the number of copies made for the digital data that the user has downloaded in the past, based on the history database 1007. Next, the distribution front end 1011 compares the number of copies made and the number of copies allowed for the service or for the digital data. If the number of copies made does not exceed the number of copies allowed, it is determined that downloading is allowed. For instance, if the user is a member of a subscription service in which the total number of downloads allowed is ten songs, and if the history database indicates that 12 songs have been downloaded, and that 3 songs have been canceled, the number of copies distributed is 9 songs. Therefore, it is determined that one more of digital data songs that belongs to the subscription service can be downloaded. (S2602)

Next, the distribution front end 1011 checks the common account database 1008, to determine whether there is a common account information for the current user. (S2603)

If there is a common account information, the distribution front end 1011 accesses another digital data distribution system, based on the common account information. Then, the distribution front end 1011 obtains a list of digital data of which the right to download has been obtained as in the processes S2601–S2602, based on the user administration database 1004, the digital data administration database 1005, the obtained rights administration database 1006, and the history database 1007, which belong to the other digital data distribution system, so as to confirm the right to download the digital data. (S2604–S2606)

Next, the distribution front end 1011 creates a screen that shows a list of digital data of which the user has the right to download, and information regarding the right to download. The distribution front end 1011 sends the screen to the user device 1002. (S2607)

The user selects digital data which he wishes to obtain, using the browsing means 1016. The selected digital data is sent to the distribution server 1001. (S2608)

Next, the device ID detecting means 1017 detects the device ID 1021 of the storage media access means 1020, which is currently connected to the user device 102. Then, the device ID detecting means 1017 sends the device ID 1021 to the distribution server 1001. (S2609)

The distribution front end 1011 determines whether there is a device ID 1021 that is registered in the user administration database 1004, among the device IDs 1021 that have been received. (S2610)

If it is determined in S2610 that there is no device ID 1021 that is registered in the user administration database 1004, this process ends.

If it is determined in S2610 that there is a device ID 1021 that is registered in the user administration database 1004, the distribution front end 1011 identifies the device ID 1021 that is registered in the user administration database 1004, out of the device IDs 1021 that have been received. Then, the distribution front end 1011 creates a screen such as the one shown in FIG. 8, which displays a list of digital data to be downloaded and a list of device IDs 1021 that have been identified. Then, the distribution front end 1011 sends the screen to the user device 1002. (S2611)

The user selects the device ID 1021 to which the digital data should be downloaded. (S2612)

Next, the media ID detecting means 1018 detects the media ID 1023 of the storage media 1022 that is attached to the storage media access means 1020 having the device ID 1021 that has been selected in S2612. Then, the media ID 1023 is sent to the server. (S2613)

The distribution front end 1011 executes a storage media legitimacy check process, which will be described later. In this manner, the distribution front end 1011 verifies the legitimacy of the storage media having the media ID. (S2614, S2615)

If it is determined that the storage media is not legitimate in S2615, the distribution front end 1011 sends to the user device a message warning of the possibility that the storage media is illegitimate. (S2616)

If it is determined that the storage media is legitimate in S2615, a storage media writing process, which will be described later, is executed. (S2617)

Lastly, the distribution front end 1011 adds to the history database the information that the digital data has been downloaded. (S2618)

The above concludes the description of the digital data download process.

Figure 27:
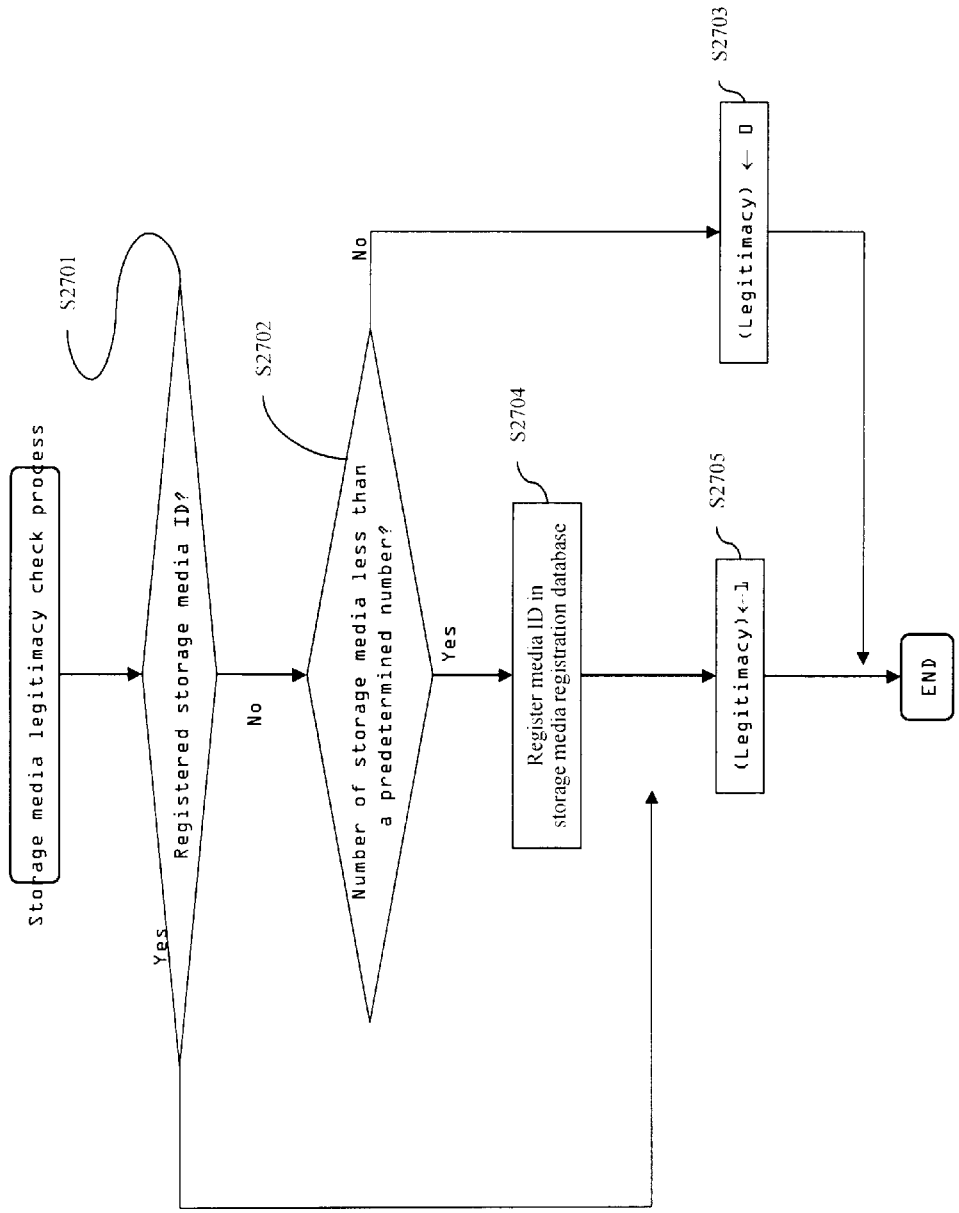
FIG. 27 shows a process flow of storage media legitimacy check.
Figure 28:
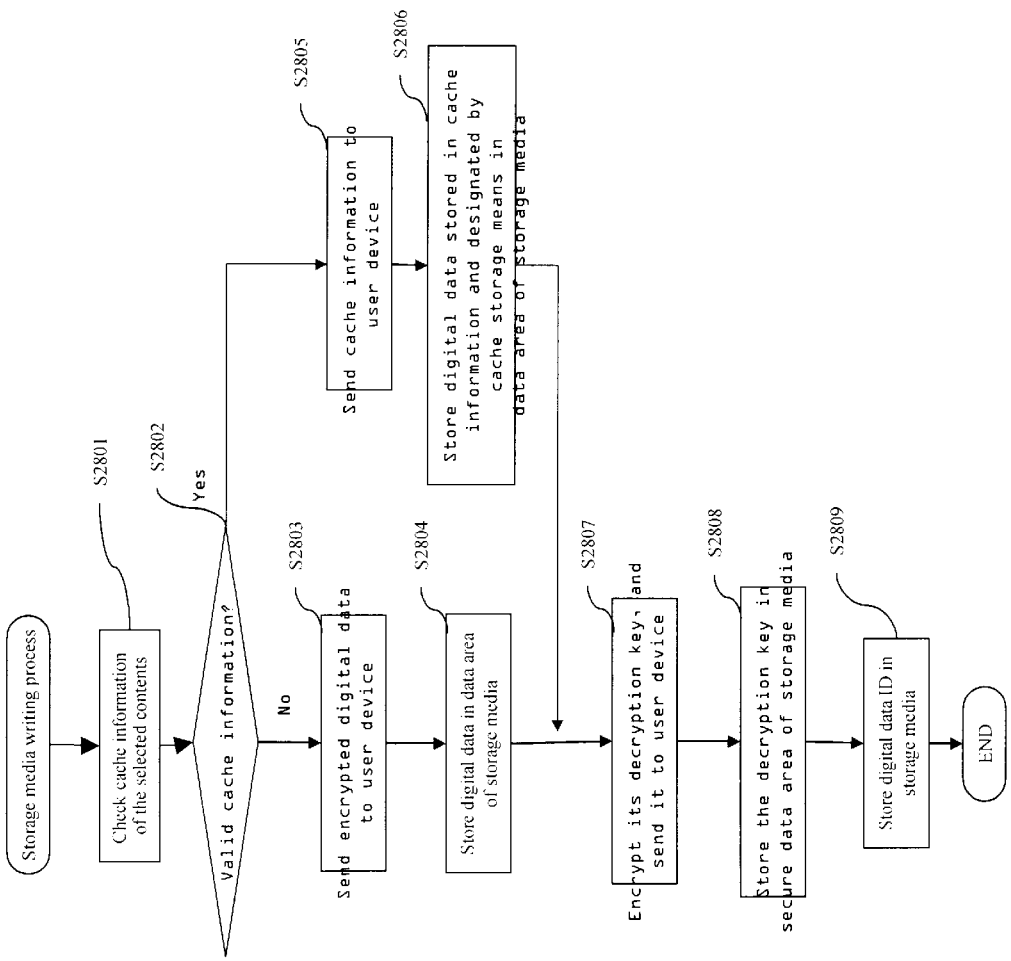
FIG. 28 shows a process flow of writing in storage media.

FIG. 27 shows an operational flow of the storage media legitimacy check process.

The distribution front end 1011 verifies whether the media ID 1023 is registered in the storage media information database of the user administration database 1004. (S2701)

If it is determined in S2701 that the media ID 1023 is registered, the distribution front end 1011 determines that the storage media is legitimate. (S2705)

If it is determined in S2701 that the media ID 1023 is not registered, the distribution front end 1011 detects from the storage media information database of the user administration database 1004, the number of media that the same user has used. Then, the distribution front end 1011 determines whether the number of media is greater than a predetermined number. (S2702)

If it is determined in S2702 that the number of media is greater than the predetermined number, the distribution front end 1011 determines that the storage media is not legitimate. (S2703)

If it is determined in S2702 that the number of media is not greater than the predetermined number, the distribution front end O 11 adds the media ID 1023 in the storage media information database of the user administration database 1004, and determines that the media is legitimate. (S2704, S2705)

This concludes the description of the storage media legitimacy check process.

FIG. 18 shows an operational flow of the storage media writing process.

The distribution front end 1011 checks the history database 1007, and determines whether there is cache information that is relevant to the digital data. (S2801, S2802)

If it is determined in S2802 that there is no cache information, the digital data distribution means 1013 sends to the user device 1002 the digital data, of which download is requested and which is stored in the distribution digital data storage means 1009. (S2803)

The media access process control means 1019 stores in the data area 1102 the digital data that has been received in S2803. (S2804)

If it is determined in S2802 that there is cache information, the digital data distribution means 1013 sends the cache information to the user device 1002. (S2805)

The media access process control means 1019 stores in the data area 1102 the digital data that is stored in the cache storage means 1024 and is designated by the cache information received in S2805. (S2806)

Next, the encryption means 1012 encrypts the decryption key that corresponds to the digital data of which download is requested, using the media ID. Then, the digital data distribution means 1013 sends the encrypted decryption key to the user device 1002. (S2807)

The media access process control means 1019 decrypts the decryption key that has been received in S2807, and sends the decryption key to the secure data area 1201 after encrypting the decryption key using the media ID. (S2808)

Lastly, the digital data ID of the digital data that has been written is stored in the storage media 1022. (S2809)

This concludes the description of the storage media writing process.

Figure 29:
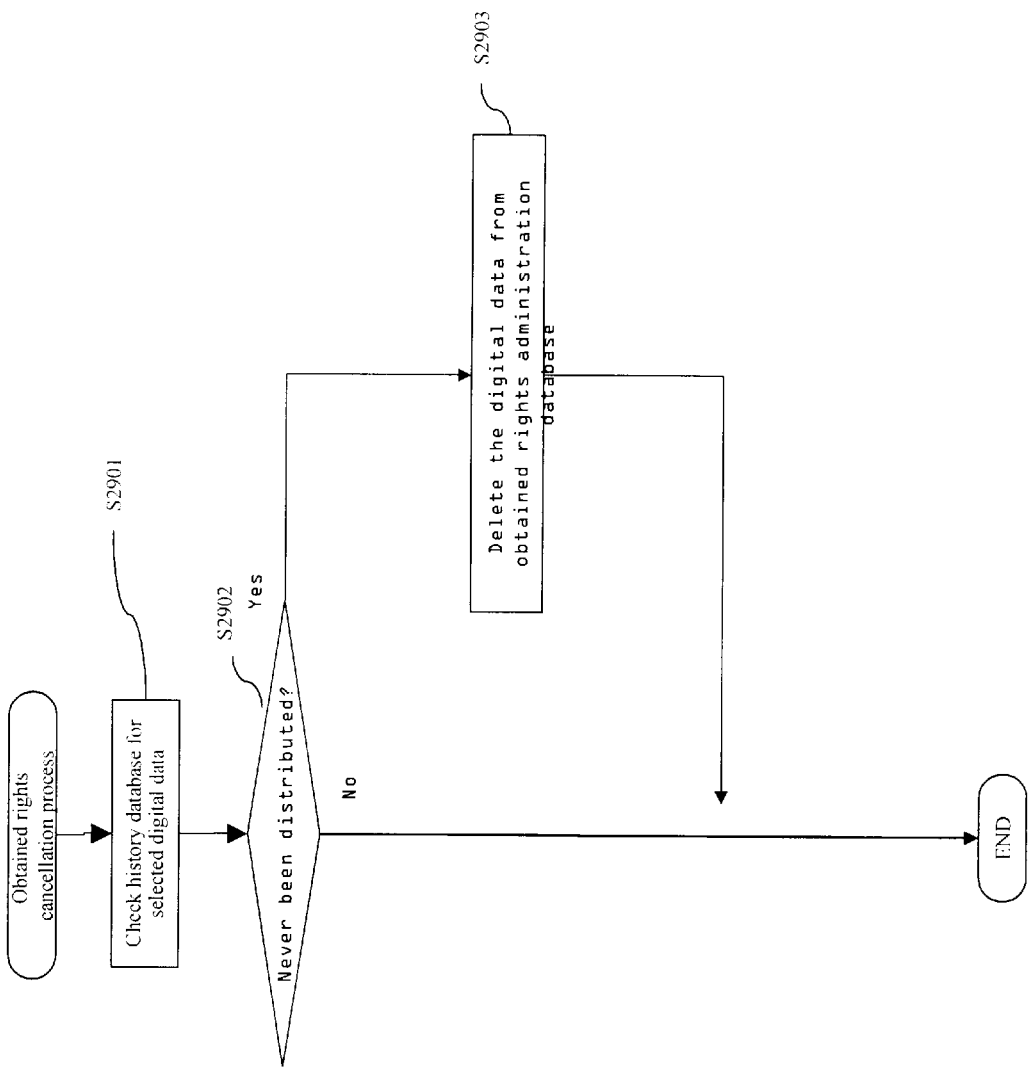
FIG. 29 shows a process flow of canceling obtained rights.

FIG. 29 shows an operational flow of the obtained rights cancellation process.

In the aforesaid digital data download process, the distribution front end 1011 creates a screen such as one shown in FIG. 7, which includes a list of digital data of which the user has the right to download, and information regarding the rights to download. The screen is then sent to the user device 1002. Then, the user can select digital data for which he wishes to cancel the right to download, using the browsing means 1016. The operations in doing so will now be described below.

Once the user makes a request to cancel the right to download, the distribution front end 1011 refers to the history database, and verifies whether or not the digital data, for which cancellation of the right to download is requested, has ever been downloaded by the same user. (S2901, S2902)

If it is determined in S2902 that the digital data has never been downloaded, the distribution front end 1011 deletes the obtained rights information regarding the digital data from the obtained rights administration database. (S2903)

If it is determined in S2902 that the digital data has been downloaded, the cancellation of the obtained rights is not executed. (S2903)

This concludes the description of the obtained rights cancellation process.

Figure 30:
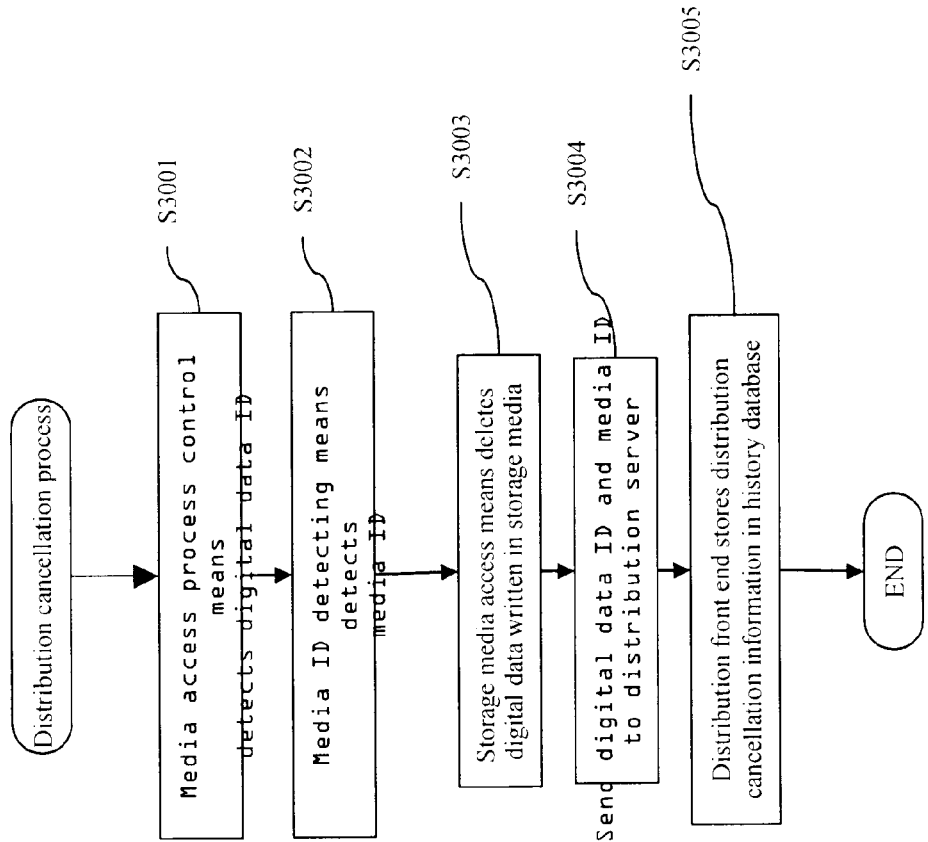
FIG. 30 shows a process flow of distribution cancellation process.

In this digital data distribution system, when the user downloads digital data once and stores the digital data in the storage media 1022, the information indicating that the digital data has been downloaded once is stored in the history database. Accordingly, the number of distributed digital data increases by one. However, by deleting the digital data that is written in the storage media 1022, the number of distributed digital data can be decreased by one. FIG. 30 shows an operational flow in doing so. Its description is as follows.

Before the storage media access means 1020 deletes the digital data from the storage media, the storage media access process control means 1019 detects the digital data ID of the digital data to be deleted. (S3001)

Also, the media ID detecting means 1018 detects the media ID 1023 of the storage media in which the digital data to be deleted is stored. (S3002)

Next, the storage media access means 1020 deletes the digital data. (S3003)

Thereafter, the digital data ID and the media ID detected in S3001 and S3002 are sent to the distribution server 1001. (S3004)

The distribution front end 1011 adds a flag information of the canceled distribution in the history database 1007, based on the information that has been received in S3004. (S3005) This concludes this process.

Figure 31:
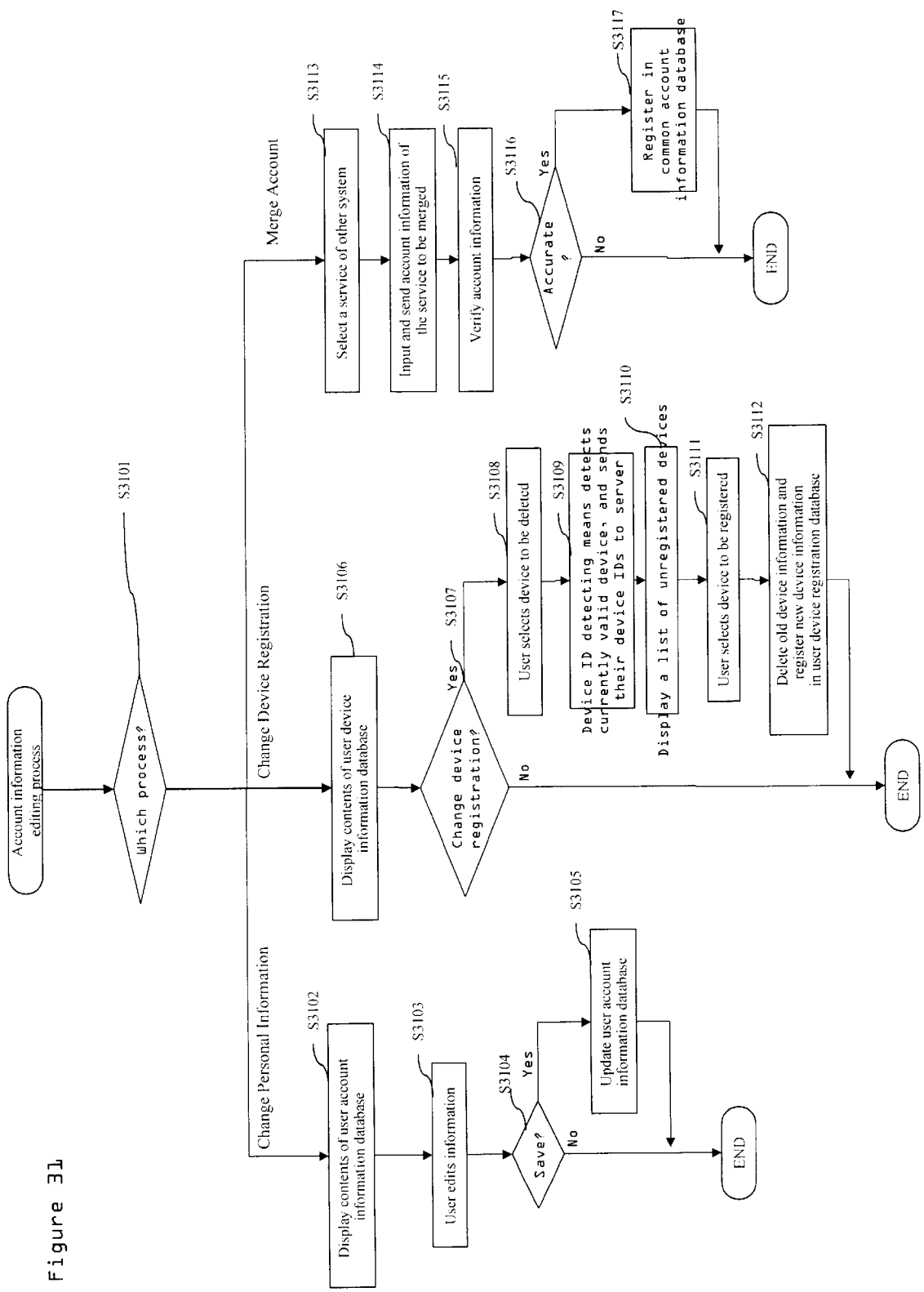
FIG. 31 shows a process flow of account information editing.
Figure 32:
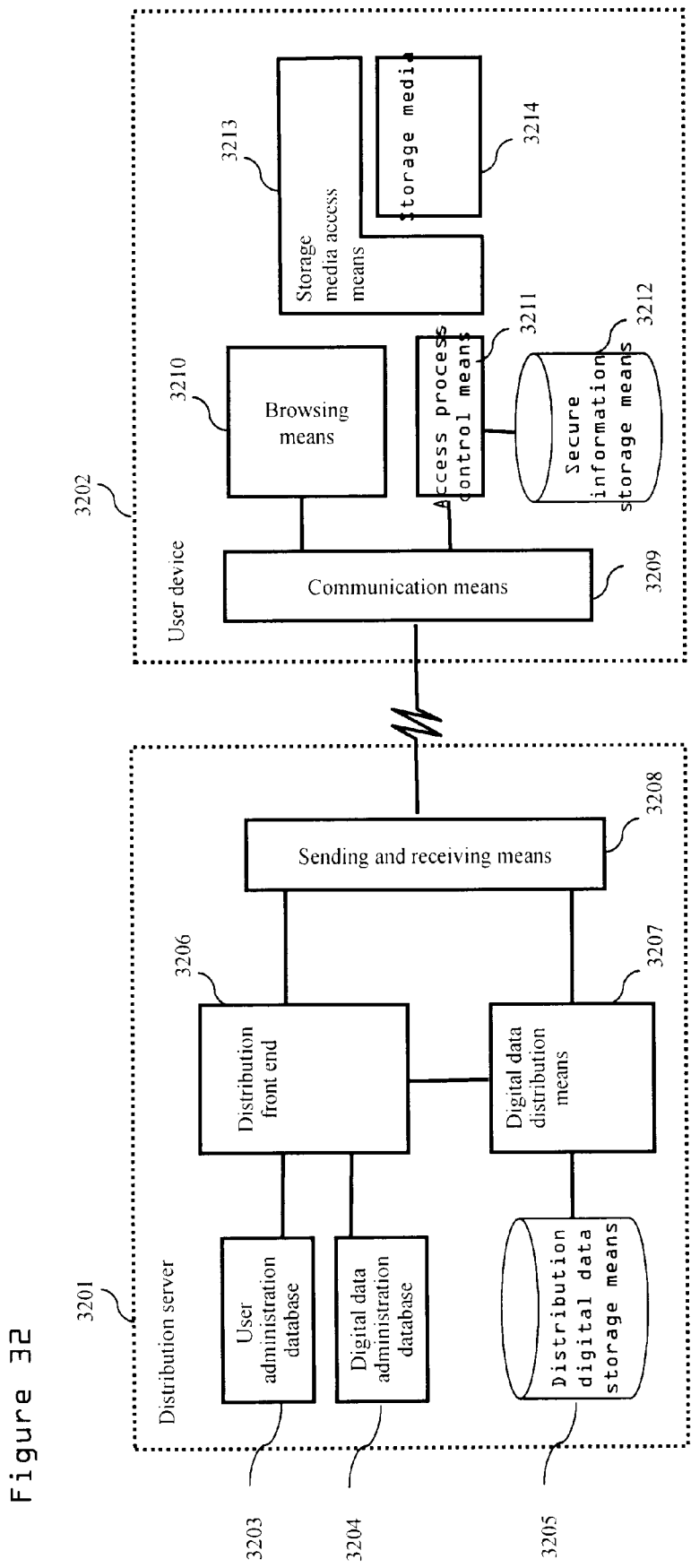
FIG. 32 is a view of conventional technology.

FIG. 31 shows an operational flow of the account information editing process.

Figure 9:
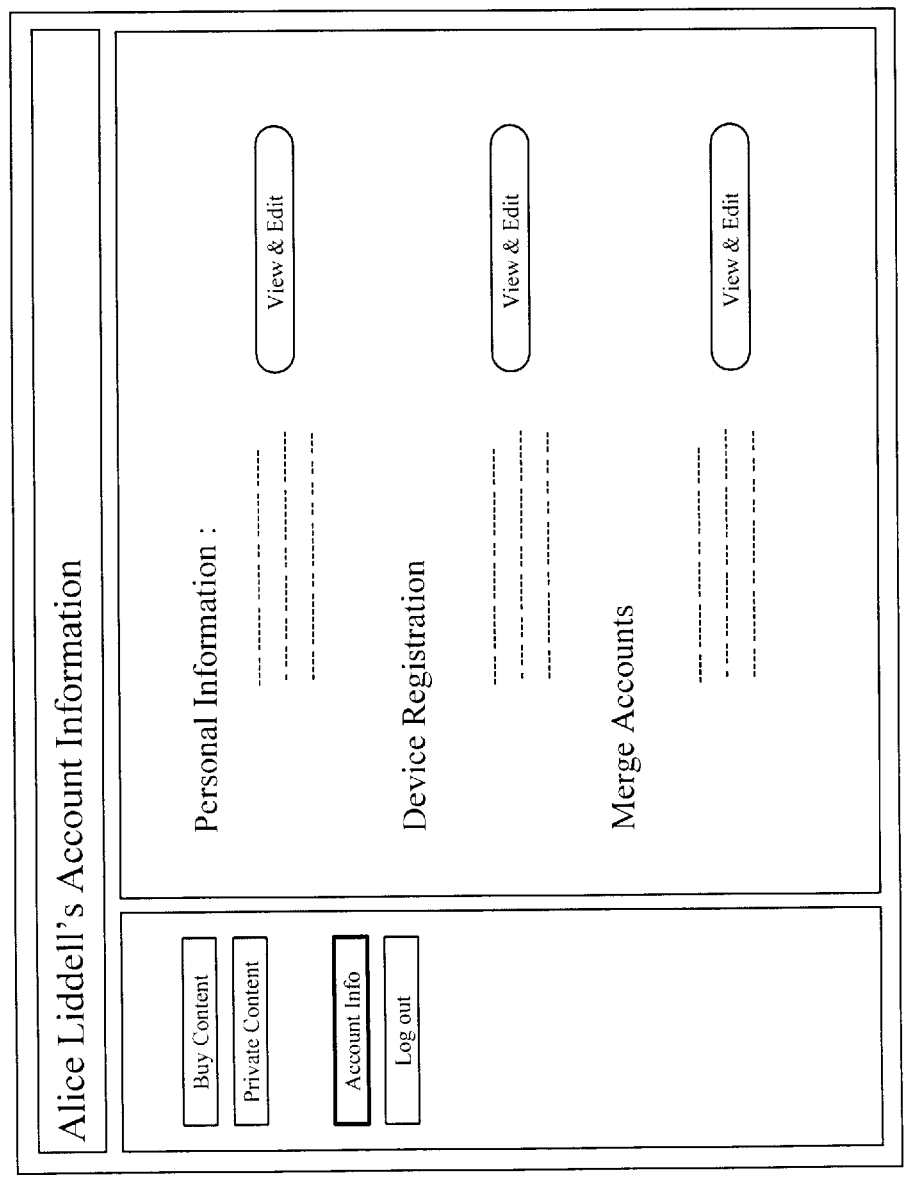
FIG. 9 shows a user account information changing screen.

In the user account information changing screen shown in FIG. 9, the user selects a process, from changing the account information, changing the device information which is allowed to be used in the service, or registering the account information of another digital data distribution service. (S3101)

If the user has selected changing of the account information in S3101, the distribution front end 1011 creates a screen that displays the user information that is currently registered in the user administration database 1004. The screen is sent to the user device 1002. (S3102)

The user edits the information using the browsing means 1016. (S3103)

Thereafter, when the user saves the edited information using the browsing means 1016, the information is sent to the distribution server. Accordingly, information in the user administration database 1004 is updated. (S3104, S3105)

If the user has selected changing of the device information which is allowed to be used in the service in S3101, the distribution front end 1011 creates a screen that displays a list of user devices that are currently registered in the user administration database 1004. The screen is sent to the user device 1002. (S3106)

The user selects the device that he wishes to delete from the list, using the browsing means. (S3107, S3108)

Next, the device ID detecting means 1018 detects device IDs 1021 of the storage media access means 1020 that are currently connected to the user device 1002. The device IDs 1021 are sent to the distribution server. (S3109)

The distribution front end 1011 creates a screen that displays a list of the device IDs 1021 that have been received and are not yet registered in the user administration database 1004. The screen is sent to the browsing means 1016. (S3110)

The user selects a device ID that he wishes to register newly. This information is sent to the distribution server 1001. If the user wishes to delete a device ID that is currently registered, instead of changing the registration, the user makes no selection. The empty information is sent to the distribution server 1001. (S3111)

Upon receiving the information, the distribution front end 1011 updates or deletes the content of the user administration database 1004. (S3112)

Figure 12:
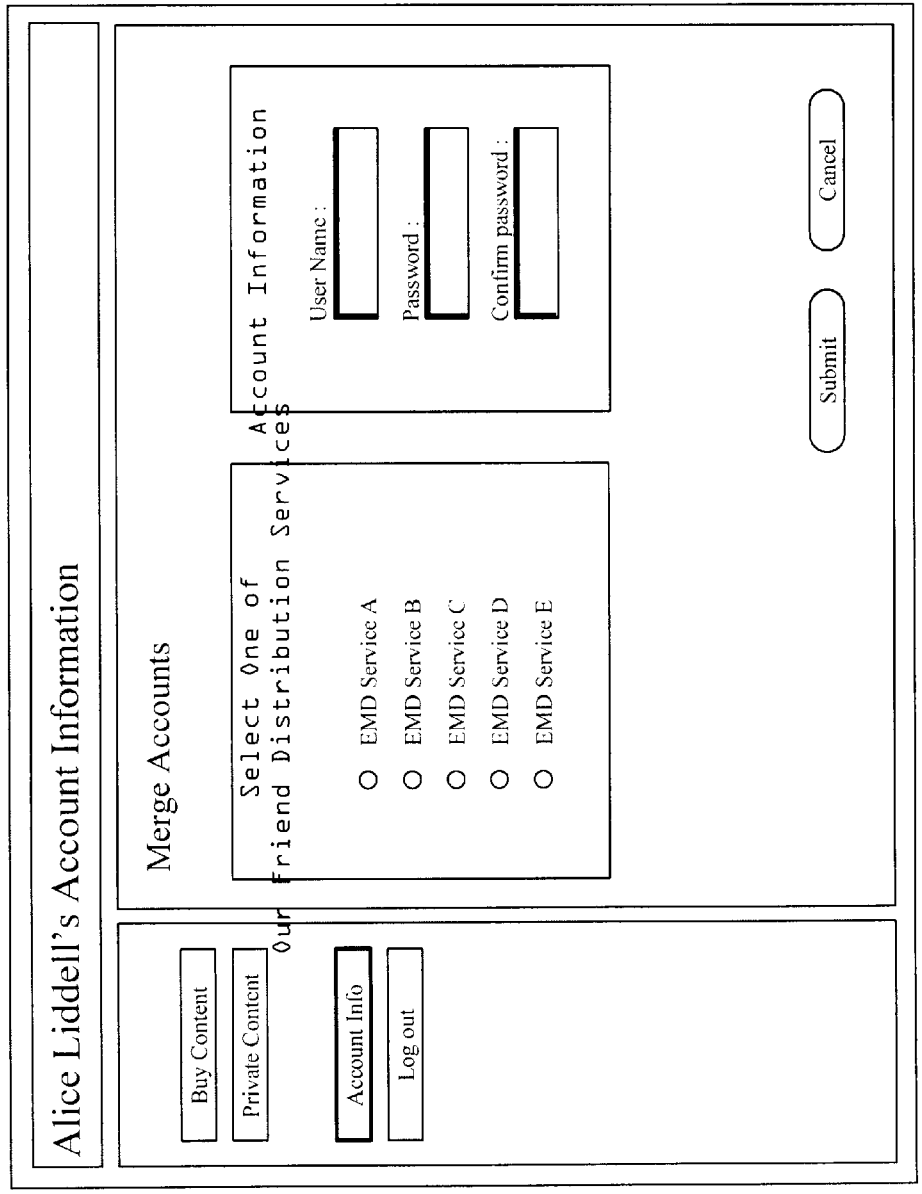
FIG. 12 shows a common account setting screen.

If the user has selected changing of the account registration of another digital data distribution service in S3101, the distribution front end 1022 creates a screen such as one shown in FIG. 12, in which a list of other digital data distribution services that are in alliance with this digital data distribution service is displayed. The screen is sent to the user device 1002. The user selects a digital data distribution service in which he has an account, using the browsing means. (S3113)

Next, the user inputs the account information of the digital data distribution service, and sends the information to the distribution server 1001. (S3114)

Upon receiving the information, the distribution server 1011 verifies whether the account information that has been received in S3114 is accurate. (S3115, S3116)

If it is determined in S3116 that the account information is accurate, the distribution front end 1011 additionally registers the account information that has been received in S3114 in the common account database 1008. (S3117)

The above concludes this process.

This concludes the description of the digital data distribution system in accordance with the present embodiment.

Although digital data is music data in the description of this embodiment, digital data can be other general electronic data, such as motion picture, static picture, digital books, and softwares.

Furthermore, although the services offered in this embodiment are the subscription service which allows unlimited number of downloads and the subscription service which has a predetermined limit on the number of downloads, other services that have different criteria can be offered if they can be executed based on information stored in the history database.

Furthermore, in this embodiment, the screens displayed by the browsing means are shown in figures. However, these screens are only an example. Actual presentation and design of the services can vary.

Furthermore, in this embodiment, the decryption key of the digital data is sent from the distribution server to the user device after being encrypted using the media ID. However, the decryption key can be sent without being encrypted. Also, the decryption key can be encrypted using secret information that is commonly shared by the distribution server and the user device.

Furthermore, the storage media of the present embodiment has the secure data area and the non-secure data area in this embodiment. However, a storage media that does not have a secure data area can also be used if the storage media has a media ID that cannot be tampered with.

Figure 2:
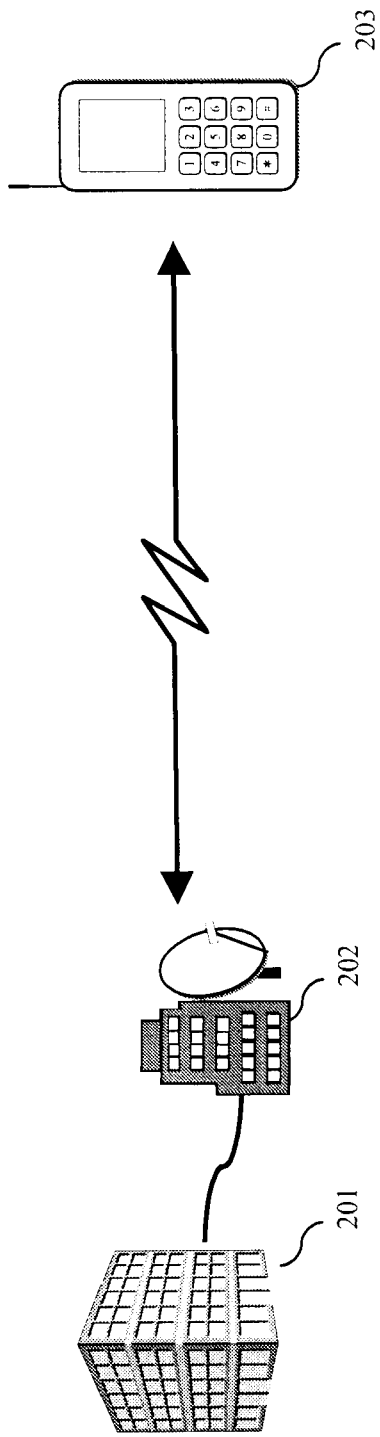
FIG. 2 shows a digital data distribution system in accordance with the second embodiment.

Furthermore, although the user device is a personal computer in this embodiment, the user device is not limited to such application. For instance, the user device can be a portable phone as shown in FIG. 2, or a STB. In FIG. 2, 201 is a digital data distribution service firm, 202 is a portable phone base station, and 203 is a portable phone.

Furthermore, the storage media access means has a device ID in this embodiment. However, if it is guaranteed that the user device and the storage media access means are always in one-to-one relation, the device ID can be placed within the user device and outside the storage media access means.

Furthermore, there are two distribution servers in the embodiment. However, there can be only one or more than three distribution servers. When there is only one distribution server, the common account database and the inter-server gateway are not needed.

With the digital data distribution system described above, since the administration of user's use conditions and history of digital data are administered on the distribution server side, it is possible to offer services that are more flexible than conventional digital data distribution system. For instance, the digital data distribution system of the present invention can offer not only authorization of use of digital data, but also discount services based on the number of times a user has downloaded in the past, and free services for users who use certain equipments.

Also, since the administration of use conditions of digital data is not conducted by the user device, there is less of a need to install a complicated tamper resistant technology that is also heavy to process and inconvenient to the users. Consequently, for system developers, there are a fewer number of processes in developing a system. Additionally, the convenience to the users will be improved.

What is claimed is:

1. A digital data distribution system comprising a user device and a distribution server, wherein:
    said user device includes:
        a communication means for accessing said distribution server;
        a browsing means for browsing information sent from said distribution server and responding to the information;
        a storage media in which the digital data distributed by said distribution server is written; and a storage media access means for reading and writing data from and in said storage media; and said distribution server includes:
a sending and receiving means for sending and receiving information and digital data to and from said user device;
a distribution front end that creates information to be sent to users and processes accesses by the users;
a user administration database that stores user IDs and related account information of the users;
a digital data administration database that stores digital data IDs and digital data storage locations of digital data to be distributed;
an obtained rights administration database that stores information regarding rights to receive distribution of digital data that each user has obtained;
a history database that stores information regarding digital data that have been distributed to the users in the past;
a distributed digital data storage means for storing digital data to be distributed; and
a digital data distribution means for sending digital data to the users based on the information from said distribution front end.

2. The digital data distribution system as set forth in claim 1, wherein:
said user device includes:
said storage media having a media ID that can uniquely identify each storage media;
a media ID detecting means for detecting the media ID and sending the media ID to said distribution server; and
a media access process control means for executing control of writing the digital data distributed by said distribution server in said storage media that has the media ID; and
said distribution server includes:
an encryption means for encrypting the distributed digital data using a key that is created based on the media ID received from said user device; and
said digital data distribution means sending to said user device the digital data that has been encrypted by said encryption means.

3. The digital data distribution system as set forth in claim 1, wherein:
said distribution server includes:
a common account database for storing account information of another digital data distribution system the user has joined;
an inter-server gateway that communicates with the another digital database distribution system registered in said common account database and accesses the another digital data distributions system using the account information stored in said common account database when a user whose information is in said common account database accesses said distribution front end; and
said distribution front end that checks said common account database when the user accesses said distribution server, said distribution front end obtaining and writing information from and in the user administration database, a digital data administration database, an obtained rights administration database, and a history database of the another digital data distribution system via said inter-server gateway, if the account information under the user ID of the user is stored in said user administration database.

4. A digital data distribution system comprising a user device and a distribution server, wherein:
said user device includes:
a communication means for accessing said distribution server;
a device ID that can uniquely identify each user device;
a device ID detecting means for detecting said device ID and sending said device ID to said distribution server;
a browsing means for browsing information sent from said distribution server and responding to the information;
a storage media in which the digital data distributed by said distribution server is written;
a storage media access means for reading and writing data from and in said storage media; and
a media access process control means for controlling the reading and writing of said storage media by said storage media access means; and
said distribution server includes:
a sending and receiving means for sending and receiving information and digital data to and from said user device;
a distribution front end that creates information to be sent to users and processes accesses by the users;
a user administration database that stores user IDs and related account information of the users;
a digital data administration database that stores digital data IDs and digital data storage locations of digital data to be distributed;
a user device administration database that stores the device ID that each user uses;
a distribution digital data storage means for storing digital data to be distributed; and
a digital data distribution means for sending digital data to the users based on the information from said distribution front end.

5. A digital data distribution system comprising a user device and a distribution server, wherein:
said user device includes:
a communication means for accessing said distribution server;
a browsing means for browsing information sent from said distribution server and responding to the information;
a storage media in which the digital data distributed by said distribution server is written;
a storage media access means for reading and writing data from and in said storage media;
a device ID that can uniquely identify said storage media access means;
a device ID detecting means for detecting said device ID and sending said device ID to said distribution server; and
a media access process control means for controlling the reading and writing of said storage media by said storage media access means; and
said distribution server includes:
a sending and receiving means for sending and receiving information and digital data to and from said user device;
a distribution front end that creates information to be sent to users and processes accesses by the users;
a user administration database that stores user IDs and related account information of the users;
a digital data administration database that stores digital data IDs and digital data storage locations of digital data to be distributed;

a user device administration database that stores said device ID that each user uses;

a distributed digital data storage means for storing digital data to be distributed; and a digital data distribution means for sending digital data to the users based on the information from said distribution front end.

6. The digital data distribution system as set forth in claim 5, wherein in response to a request for digital data distribution from a user who is accessing said distribution server:

said distribution front end directs said device ID detecting means to identify a current device ID;

said device ID detecting means identifies said device ID and sends said device ID to said distribution server; and said device ID that said distribution front end received is registered in said user device administration database along with a corresponding user ID.

7. A digital data distribution system comprising:

a user device; and a distribution server;

wherein said user device comprises:
  a communication device operable to access said distribution server;
  a browsing device operable to browse information sent from said distribution server and respond to the information;
  a storage media in which the digital data distributed by said distribution server is written; and
  a storage media access device operable to read data from, and write data to, said storage media; and wherein said distribution server comprises:
  a sending and receiving device operable to send information and digital data to, and receive information and digital data from, said user device;
  a distribution front end operable to create information to be sent to users and process accesses by the users;
  a user administration database operable to store user IDs and related account information of the users;
  a digital data administration database operable to store digital data IDs and digital data storage locations of digital data to be distributed;
  an obtained rights administration database operable to store information regarding rights to receive distribution of digital data that each user has obtained;
  a history database operable to store information regarding digital data that have been distributed to the users in the past;
  a distributed digital data storage device operable to store digital data to be distributed; and
  a digital data distribution device operable to send digital data to the users based on the information from said distribution front end.

8. The digital data distribution system as set forth in claim 7, wherein:

said storage media has a media ID which uniquely identifies each storage media; and said user device comprises:
  a media ID detecting device operable to detect the media ID and send the media ID to said distribution server; and
  a media access process control device operable to execute control of writing the digital data distributed by said distribution server in said storage media that has the media ID; and said distribution server comprises:
  an encryption device operable to encrypt the distributed digital data using a key that is created based on the media ID received from said user device; and said digital data distribution device is operable to send, to said user device, the digital data that has been encrypted by said encryption device.

9. The digital data distribution system as set forth in claim 7, wherein:

said distribution server comprises:
  a common account database operable to store account information of another digital data distribution system the user has joined;
  an inter-server gateway operable to communicate with the another digital database distribution system registered in said common account database and access the another digital data distributions system using said account information stored in said common account database when a user whose information is in said common account database accesses said distribution front end; and said distribution front end that checks said common account database when the user accesses said distribution server, wherein said distribution front end is operable to obtain information from, and write information in, the user administration database, a digital data administration database, an obtained rights administration database, and a history database of the another digital data distribution system via said inter-server gateway, if the account information under the user ID of the user is stored in said user administration database.

10. A digital data distribution system comprising:

a user device; and a distribution server;

wherein said user device comprises:
  a communication device operable to access said distribution server;
  a device ID operable to uniquely identify each user device;
  a device ID detecting device operable to detect said device ID and send said device ID to said distribution server,
  a browsing device operable to browse information sent from said distribution server and respond to the information;
  a storage media in which the digital data distributed by said distribution server is written;
  a storage media access device operable to read data from, and write data in, said storage media; and
  a media access process control device operable to control the reading and writing of said storage media by said storage media access device; and wherein said distribution server comprises:
  a sending and receiving device operable to send information and digital data to, and receive information and digital data from, said user device;
  a distribution front end operable to create information to be sent to users and processes accessed by the users;
  a user administration database operable to store user IDs and related account information of the users;
  a digital data administration database operable to store digital data IDs and digital data storage locations of digital data to be distributed;
  a user device administration database operable to store the device ID that each user uses;

a distribution digital data storage device operable to store digital data to be distributed; and a digital data distribution device operable to send digital data to the users based on the information from said distribution front end.

11. A digital data distribution system comprising:

a user device; and a distribution server;

wherein said user device comprises:
- a communication device operable to access said distribution server;
- a browsing device operable to browse information sent from said distribution server and respond to the information;
- a storage media in which the digital data distributed by said distribution server is written;
- a storage media access device operable to read data from, and write data in, said storage media;
- a device ID operable to uniquely identify said storage media access device;
- a device ID detecting device operable to detect said device ID and send said device ID to said distribution server; and
- a media access process control device operable to control the reading and writing of said storage media by said storage media access device; and wherein said distribution server comprises:
- a sending and receiving device operable to send information and digital data to, and receive information and digital data from, said user device;
- a distribution front end operable to create information to be sent to users and processes accessed by the users;
- a user administration database operable to store user IDs and related account information of the users;
- a digital data administration database operable to store digital data IDs and digital data storage locations of digital data to be distributed;
- a user device administration database operable to store said device ID that each user uses;
- a distributed digital data storage device operable to store digital data to be distributed; and
- a digital data distribution device operable to send digital data to the users based on the information from said distribution front end.

12. The digital data distribution system as set forth in claim 11, wherein in response to a request for digital data distribution from a user who is accessing said distribution server:

said distribution front end is operable to direct said device ID detecting device to identify a current device ID;

said device ID detecting device is operable to identify said device ID and send said device ID to said distribution server; and said device ID that said distribution front end receives is registered in said user device administration database along with a corresponding user ID.

* * * * *